United States Patent [19]
Stolzer

[11] 3,810,404
[45] May 14, 1974

[54] APPARATUS FOR SUPPLYING MATERIAL

[75] Inventor: Paul Stolzer, Achern, Germany

[73] Assignee: Keura Maschinenbau Gesellschaft vit beschrankter Haftung & Co. Kommanditgesellschaft, Achern, Germany

[22] Filed: Dec. 18, 1972

[21] Appl. No.: 316,427

[30] Foreign Application Priority Data
Dec. 18, 1971  Germany............................ 2163101

[52] U.S. Cl................................ 83/71, 83/71, 83/417, 83/520
[51] Int. Cl............................................. B26d 7/06
[58] Field of Search................... 83/71, 417, 520

[56] References Cited
UNITED STATES PATENTS

| | | | |
|---|---|---|---|
| 3,260,143 | 7/1966 | Rudgisch et al. | 83/417 X |
| 3,330,175 | 7/1967 | Bridges | 83/417 X |
| 3,685,211 | 8/1972 | Marchand | 83/417 |

*Primary Examiner*—J. M. Meister
*Attorney, Agent, or Firm*—Spencer & Kaye

[57] ABSTRACT

Material supply apparatus including pallets of equal size on which material to be fed to a cutting machine may be stored. The pallets are arranged, one above another, in alignment with one another in storage bays formed by shelving units. The storage bays of each shelving unit are positioned one above another. At least one of the shelving units is positioned in spaced relation with respect to another of the shelving units transversely of the longitudinal extent of the pallets, providing a free space between these shelving units. The width of the free space is greater than that of the pallets. A conveyor which is drivable in two opposite directions is positioned between the cutting machine and a withdrawal bay operatively associated with one of the shelving units. The withdrawal bay is part of an arrangement which includes members for withdrawing material from the pallets onto the conveyor and for reinserting material from the conveyor onto the pallets. Pallet transport devices are arranged for transporting the pallets from the storage bays into the withdrawal bay and back again. The transport devices, the members for withdrawing and reinserting material, and the conveyor are coupled to a program control system and are controlled by signals therefrom. A data carrier provided on each pallet is adapted to store data which determine the working speed of the cutting machine and the pressure exerted by clamping devices associated with the machine on the material being cut with regard to the nature of the material assigned to each respective pallet. A sensor is operatively associated with the withdrawal bay for sensing the data carried by the data carriers. The cutting machine and the clamping jaws are responsive to signals from the sensor which establish the working speed of the machine and the pressure exerted by the clamping jaws.

50 Claims, 19 Drawing Figures

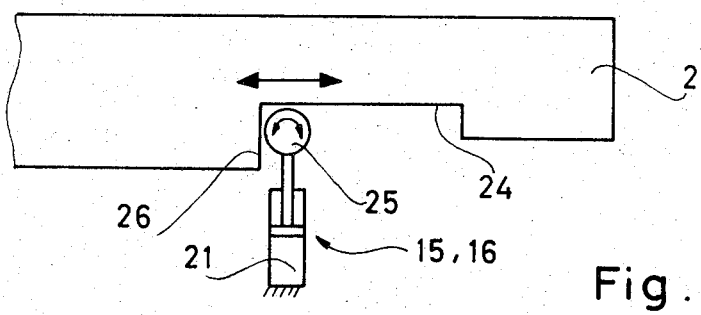
Fig. 7
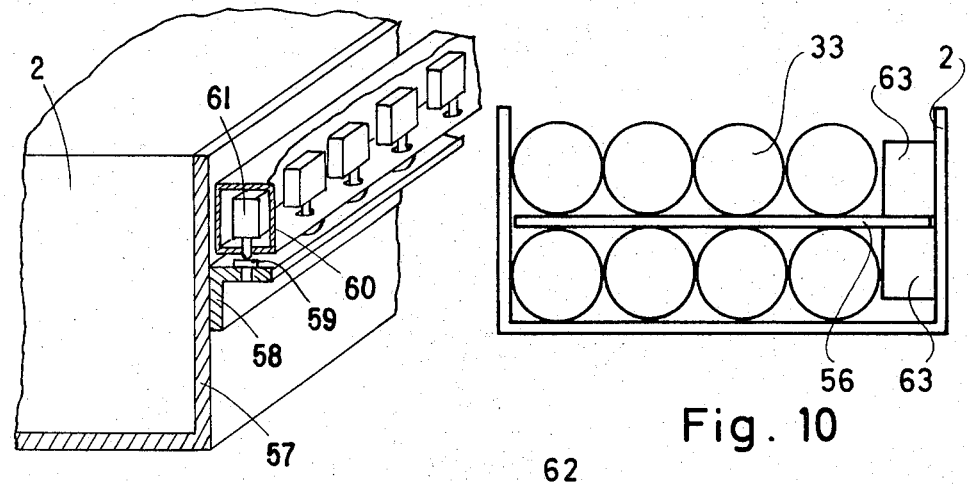
Fig. 8
Fig. 10
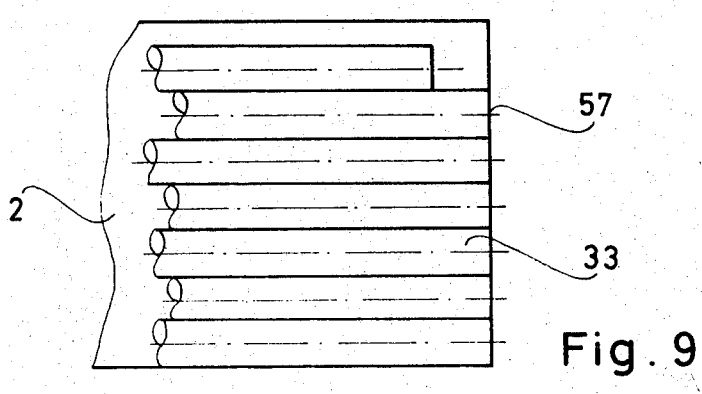
Fig. 9

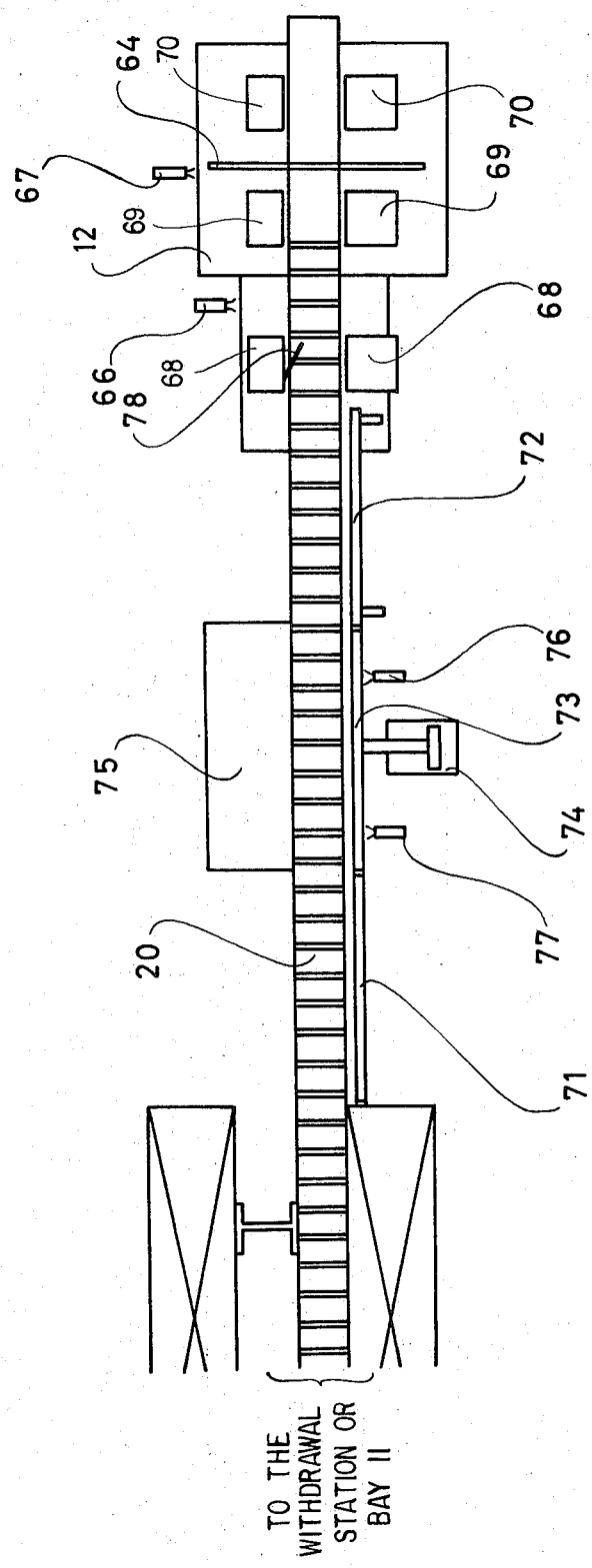

APPARATUS FOR SUPPLYING MATERIAL

BACKGROUND OF THE INVENTION

This invention relates to an apparatus for supplying automatically material to a cutting machine and for determing the cutting speed and clamping pressure exerted on the material by the cutting machine. The invention relates, more particularly, to an apparatus for automatically supplying a cutting machine with material in rod form, the cutting machine being in communication with a program control system into which piece numbers and lengths of the parts to be cut from the inserted material can be introduced for predetermining an automatic course of work, and by which the cutting member which returns automatically to an initial position after every cutting operation, is caused to carry out the next cutting operation after similarly program-controlled devices have advanced the material automatically by the length of the part to be cut off, taking into account the cutting loss caused by the cutting device, the material being held fast by clamping members arranged beside the cutting device, after the feed movement for the cutting operation has taken place.

Circular saws, band saws, hack saws, flame-cutting machines, and other conventional cutting tools, for example, can be used for the cutting device of the cutting machine. However, for simplicity, reference will be made hereinafter only to circular saws, without the invention being thereby limited thereto.

The known automatically working cutting machines offer the advantage that after the insertion of a material rod and introduction of an appropriate working program, without further aid one can obtain a number of work pieces cut from this material rod, which number is as large as desired according to the storage capacity of the program control system. When however the inserted material rod is used up, then, if the program has not yet terminated, a fresh material rod must be inserted. If however the program is terminated before the material rod is consumed, the material rod residue must be returned to storage and a rod of the next kind to be worked must be inserted and a new program introduced. These tasks require the constant activity of at least one operator, so that despite the largely automatic nature of the operation of the cutting machine, there is a relatively high labor cost involved, which contributes a large percentage of the fabrication cost. The operator also has the task of adjusting the working values, such as cutting speed, feed speed, clamping pressure, etc., in each case in relation to the material about to be worked, which presumes at least certain experience, so that only approximately qualified operations can be used. On the other hand, these highly skilled operators are not fully exploited because of the highly automatic nature of operating the cutting machine.

A further problem involves the storage of the material to be worked. If the material is to be accessible without further aids, with the exception of the usually existing requirement of a lifting crane, then one is bound to a stack height in the range of the human body size, and furthermore sufficient space for freedom of movement of the operator and material must be present between the stacking positions, which are preferably formed as shelving units. This is equally valid for the cases where, in place of a crane, the material conveying is effected, for example, by a fork lift truck or the like. Of course the possibility also exists of using higher shelving units, the upper compartments of which are then accessible to the operator by means of a ladder, so that the material may be attached to a crane. However all these possibilities are relatively complicated, space-consuming and involve considerable dangers of accident to the operator.

SUMMARY OF THE INVENTION

An object of the present invention is to provide an apparatus with which an automatically operable cutting machine can be supplied completely automatically with material.

Another object of the present invention is to provide an apparatus for supplying material to an automatically operable cutting machine over a relatively long period of time, for example one or more days.

A further object of the present invention is to provide an apparatus for supplying different materials to an automatically operable cutting machine, taking account of the particular properties of such materials.

A still further object of the present invention is to provide an apparatus for supplying material to an automatically operable cutting machine which assures space-saving storekeeping, in consideration of frequently very high floor area costs.

Yet another object of the present invention is to provide an apparatus for supplying material to an automatically operating cutting machine which is very simple to operate.

The foregoing objects are achieved by providing an apparatus for automatically supplying material in rod form to a cutting machine which is provided with a material cutting member, jaws for clamping the material during cutting and after it has been advanced and parts for returning the cutting machine to an initial position automatically after each cutting operation. A program control system is provided into which a main program of piece numbers and data for determining the respective length of parts to be cut from the material can be introduced. The apparatus includes members responsive to signals from the program control system for advancing the material into the cutting machine in respective lengths to be cut off including cutting loss caused by the cutting member. Pallets of equal size are provided on which material to be fed to the cutting machine may be stored. The pallets are arranged one above another, in alignment with one another in storage bays formed by shelving units. The storage bays of each shelving unit are positioned one above another. At least one of the shelving units is positioned in spaced relation with respect to another of the shelving units transversely of the longitudinal extent of the pallets, providing a free space between these shelving units. The width of the free space is greater than that of the pallets. A conveyor which is drivable in two opposite directions is positioned between the cutting machine and a withdrawal bay operatively associated with one of the shelving units. The withdrawal bay is part of an arrangement which includes members for withdrawing material from the pallets onto the conveyor and for reinserting material from the conveyor onto the pallets. Pallet transport devices are provided for transporting the pallets from the storage bays into the withdrawal bay and back again. The transport devices, the members for withdrawing and reinserting material, and the conveyor are coupled to the program control system and are controlled by signals therefrom. A data carrier provided on each pallet is adapted to store data which determine the working speed of the cutting machine and the pressure exerted by the clamping jaws on the material being cut with regard to the nature of the material assigned to each respective pallet. A sensor is operatively associated with the withdrawal bay for sensing the data carried by the data carriers. The cutting machine and the clamping jaws are responsive to signals from the sensor which establish the working speed of the machine and the pressure exerted by the clamping jaws.

The invention provides apparatus in which the material is stored on a plurality of pallets of substantially equal size, only material of one substance and one cross-section being situated on any one pallet. The pallets are arranged substantially one above the other and in substantial alignment with one another in that direction in bays formed by shelving units. The shelving units of at least one row of shelving units stand side by side transversely of the longitudinal extent of the pallets. A free space is provided between the shelving units in this direction, the width of which is greater than that of the pallets. One bay of a shelving unit operates as a withdrawal station and includes a withdrawl device for withdrawing the material from the pallets and for the reinsertion of the material from a conveyor, extending between the cutting machine and the withdrawal device, parallel to the pallets and drivable in both directions. The conveyor extends to the cutting machine arranged close to the withdrawal device in the longitudinal direction of the pallets. Over each row of shelving units, a mobile transport device is provided. The pallets can be moved by the transport device from the bay allocated to them by way of the free space between the shelving units and over the shelving units, into the withdrawal station or into a first free bay in the vicinity of the withdrawal station and out of the withdrawal station or a second free bay in the vicinity of the withdrawal station back again. The controlling of the course of work of the transport device, the withdrawal station and the conveyor is likewise effected by the program control system with additional consideration of the material and cross-section of the parts to be cut off. Each pallet has a data carrier by which, in combination with a sensing device associated with the withdrawal station, the working speed of the cutting machine and the pressure exerted by the clamping means upon the material are adjusted in regard to the material contained in the pallet.

Due to these measures, on the basis of a central fixed program for recurring courses of work of the individual parts of the apparatus, a program directed to the desired material parts can be introduced likewise centrally, the working values of the cutting machine then being adjusted by the program contained on the data carriers of the individual pallets, when the latter are respectively moved into the withdrawal station. Thus the apparatus has a fixed program for ever recurring courses of movement, which can be supplemented by two variable programs, namely firstly the introduced order and secondly the specifications pertinent to the material which are contained on the respective data carriers arranged on the respective pallets.

As program carriers, all known possibilities such as magnetic tape, patch-panel, punched card, etc., may be used in practicing the present invention. However, it has proved expedient for the program for the recurring working courses to be fixedly installed, while the "orders" are introduced by means of punched cards and the data on the punched cards pertaining to the material carried by the respective pallet are sensible or scannable, for example, mechanically by conventional means. Thus the individual programs are independent of one another and by way of example the data carrier of any given pallet can easily be converted, with regard to the material contained by that pallet, while the basic program present for the recurring courses of work has to be modified only if the storage position of the pallet with this material is changed.

By the arrangement of the shelving units, the withdrawal bay for the material and the formation and position of the transport device, it is also ensured that the material is accommodated in an extremely space-saving manner and can be brought from the storage positions to the withdrawal station and back without the need for appreciable space requirements.

It has proved favorable that the shelving units include at least two vertical supports. The bays for holding the pallets, with the exception of the bay which comprises the withdrawal station, are formed of arms secured on both sides to these vertical supports, these arms pointing transversely of the longitudinal extent of the pallets. The arms and thus the supports are spaced inboard from the longitudinal ends of the pallets.

It is further advantageous for the transport device to include a U-shaped framework extending over the shelving units. The free ends of the arms of the U-shaped framework support themselves on tracks extending horizontally beside the shelving units and are mobile on these by a drive device; the track lying closest to the cutting machine extends with spacing above the conveyor. Each arm extends horizontally and in the longitudinal direction of the pallets and is vertically displaceable, the arms being synchronized as regards this displacement; the arms extend into the region of the pallets in such a way that they are movable out of the free space between the shelving units to beneath the pallets.

These measures help towards an extraordinarily space-saving and well-ordered store-keeping for the material. Due to the fact that the transport of the pallets to the withdrawal bay and back again takes place over the shelving units, especially in view of the relatively great necessary length of the pallets, the transport device occupies only little space.

With the basic program for the reoccuring working courses, in the simplest case, a pallet is brought, for the working of the material contained in it, into the withdrawal station and is conveyed back again to its standing or storage position after the working of the material. However, if only one row of shelving units is present it has proved expedient to arrange a first and a second free bay directly above the withdrawal station. Especially in the case of the presence of several shelving unit rows, however, it is advantageous to arrange the first and second free bays opposite to the withdrawal station in the neighboring shelving unit and to provide a mobile transfer device, movable in the longitudinal direction of the shelving unit row, for the pallets between this shelving unit and the withdrawal station. In this case, every further row of shelves includes two free bays; these bays can be in alignment in the longitudinal direction of the pallets with the first and second free bays and the mutually aligned bays can be connected with one another by a shifting device for the pallets.

In this arrangement, the pallet with the material to be worked next can be brought into the first free bay by the transport device and possibly the shifting device, while the preceding material is still being worked. The pallet for the latter material, after completion of the work, can be placed by the transport device or by the transfer device into the second free bay, then the pallet with the material to be worked subsequently can be transferred into the withdrawal station and finally during the working of this material the pallet with the previously worked material can be conveyed back to its storage position. In this way the stoppage time for one or more cutting machines can be reduced to a minimum, since the transport, transfer and shifting devices for the pallets have sufficient time, as a rule, during the working of a specific material to bring the pallet with the previously worked material back to its storage position over a long distance and to bring up the pallet with the material to be worked subsequently over a relatively shorter distance.

It has proved expedient that the shifting device for mutually aligned bays consists of a multi-axle, automatically moved trolley. The trolley is movable on rails connecting the mutually aligned bays, between these bays; these rails are interrupted in the region of movement of U-arms of the transport devices. The trolley axles are distributed over the length of the trolley in such a way that the trolley is always horizontally guided despite the interruption of its rails. The latter can be the case, for example, when four or more axles are uniformly distributed over the length of the trolley, which corresponds approximately to the length of the pallets.

The withdrawal station or the transfer device can include, in preferred embodiments, at least two synchronously vertical and horizontally displaceable supports for the pallets, and the pallets can be moved by these supports upwards and in the direction towards the conveyor against stops of the withdrawal station which limit the vertical and horizontal movements.

It is expedient for the pallets to have recesses on their underside to engage the supports for adjustment in the longitudinal direction. The supports are engaged in the recesses by rollers rotatably carried by them in a plane which is parallel to the longitudinal extent of the pallets. The axes of the rollers are horizontally adjustable. In another preferred embodiment the pallets carry recesses on the underside for engagement with the supports, for adjustment in the longitudinal direction. The first free bay or the shifting device allocated to this bay includes auxiliary supports fitting these recesses; the auxiliary supports are engaged in the recesses by rollers carried by them for rotation in a plane parallel to the longitudinal extent of the pallets.

Both the vertical and the horizontal movements of the supports can be effected by cylinder-piston units. If both the vertical and the horizontal movements are carried out by the supports forming part of the withdrawal station, the cylinder-piston units for the horizontal movement are vertically displaceable with the vertical movement. If however the vertical and the horizontal movements are carried out by the supports of the transfer device, then it is expedient that the cylinder-piston units for the horizontal movement act upon the transfer device. In this case, these cylinder-piston units can serve at the same time for the displacement of the transfer device between the withdrawal station and the first or the second free bay and the possibility also exists of aligning the pallets in the first free bay by these cylinder-piston units for the horizontal movement against stops in the horizontal direction.

The synchronization of the movements of mutually associated cylinder-piston units can take place because the moving part of each cylinder-piston unit carries a rack extending in the direction of movement and each rack meshes with a pinion. The pinions of mutually associated cylinder-piston units are arranged on one common shaft.

Of course the synchronization of the movements of the cylinder-piston units is also possible in other ways, for example hydraulically. For this purpose the cylinder-piston units can be formed as double-acting cylinder-piston units in which the cylinder chamber which provides a lesser or reduced stroke movement of one cylinder-piston unit is connected with the cylinder chamber of the other cylinder-piston unit which provides a greater or enlarged stroke movement, the interconnected cylinder chambers having piston areas of equal size.

The above-described measures ensure a constantly uniform insertion of the pallets into the withdrawal station. The recesses situated on the underside of the pallets, in combination with the rollers of the supports or auxiliary supports, especially also contribute to this, for they always effect a precise adjustment of the pallets in the longitudinal direction.

Thus if a pallet should be set down somewhat offset in the longitudinal direction, it can move in the longitudinal direction under the influence of gravity and by virtue of the rollers provided on the supports so far that the rollers come into the recesses. These movements are relatively short since a longitudinal displacement of the pallets can occur practically only due to the freedom present on the arms of the transport device as a result of tolerances.

When a pallet is brought into its position in the withdrawal station, it is expedient for end contacts to be freed or opened when the pallet comes into contact with the stops, by which contacts the vertical and horizontal movements of the supports can be shut off. This prevents the pallets from being pressed against the stops with considerable force over a relatively long period of time, which firstly would be superfluous and also would necessitate a correspondingly robust, heavy construction of the stops. Since on contact with the stops, the end contacts are freed or opened, it is also ensured that the end contacts are not destroyed if the shutting off of the cylinder-piston units of the supports, instigated by them, should not take place. In any case, the over-pressure valves present in the pressure medium circuit of the cylinder-piston units ensure limitation of the pressure producible by the cylinder-piston units, so that destruction of the stops or damage to them is avoided.

The withdrawal station, in a preferred embodiment, includes at least two vertically and synchronously displaceable lifters, the width of which corresponds to the internal width of the pallets, measured perpendicularly of the longitudinal extent. The pallets have bottom openings corresponding to the cross-section of the lifters and the withdrawal station further includes at least two horizontally and synchronously movable push members with which the material, after lifting out of the pallet, is movable onto the conveyor. The withdrawal station has at least two further horizontally and synchronously movable pushers with which the material is movable into the pallet from the conveyor after working. The mutually associated push members are connected with one another by a plate carried by them in the region of their part which comes into contact with the material.

The displacement of the lifters and the push members can be effected by cylinder-piston units; the moving part of each cylinder-piston unit can carry a rack extending in the direction of movement. For synchronization, each rack can mesh with a pinion. The pinions allocated to the lifters, the push members and the further push members can be seated on one common shaft. Here again other equivalent means are also usable for example a hydraulic synchronous control system such as has been described above.

If several lifters are provided it is expedient to arrange these on one common carrier extending in the longitudinal direction of the pallets, and to permit the cylinder-piston units to act upon this carrier.

So that initially only one material rod can ever arrive from the pallets on the conveyor and thus be fed to the cutting machine, it is advantageous that the movement of the push members which bring the material onto the conveyor can be interrupted by a stop arranged above the conveyor for the material. An end contact is operable by this stop, the stop being adjusted so that in each case only one material rod is movable onto the conveyor at any given time. The adjustment of this stop is effected by a stop displaceably arranged on the pallets and the interruption of the push member movement for the withdrawal of a further material rod is eliminated only when the material rod supplied to the cutting machine is consumed and still further parts have to be cut off from the material being worked.

In this case the stop for the material and the end contact can be connected to a carriage and the adjustment of the carriage can take place by the stop situated on the pallets, against the force acting upon the carriage.

The stop for the adjustment of the material stop is arranged on the underside of the pallets. The carriage is horizontally movable, the material stop and the end contact being seated on the carriage. The carriage is adjustable by the stop of the pallets through an arm connected with the carriage, the force being generated by a spring or a cylinder-piston unit. According to another preferred embodiment, the stop for the adjustment of the material stop is arranged before a transverse wall which closes off the pallets in the direction of the cutting machine. The carriage in this case, is movable obliquely upwards by this stop, the material stop being formed by an arm connected with the carriage. The carriage is supported through the end contact on the stop of the pallets, the force being formed by the gravity force of carriage, arm, stop, etc.

In both cases, the material stop and the parts connected with it can be displaceable away from the pallet situated in the withdrawal device when the conveyor is in operation. Thus it is ensured that the material stop is not damaged by the material sliding along on it.

Due to these measures, the adjustment of the stop always takes place automatically upon the insertion of a pallet into the withdrawal station, while a precise consideration of the cross-section of the material contained in the pallet can take place by the stops situated on the pallet.

If several layers of material are to be accommodated in one pallet, it is advantageous to separate these by interposed plates. It can be provided, in this case, that on the consumption of one layer of material before the next layer of material is lifted out it is raisable by an amount corresponding to the thickness of the plates. The plates are then ejectable by one of the pairs of push members. This can take place, after the consumption of a layer of material; for example, the push members which bring the material onto the conveyor can push the plates off the pallet in their return movement.

The courses of movement as described can be controlled by two end contacts arranged on the push members which bring the material on to the conveyor. One of the end contacts initiates the lifting out of the plate whenever the push members bring the last rod of material of the preceding material layer on to the conveyor. The other end contact is actuated by the running of the plate against it and interrupts the movement of the lifters and thus limits this movement to an amount which is less than the plate thickness.

It is further expedient that in the case of material for processing whose front first has to be cut smooth, the material rods which are not yet cut smooth are inserted, with the front against a closing transverse wall of the pallets, by thrusting them into the pallets, while already processed material rods or rods which do not have to be cut smooth lie spaced from the transverse wall in the pallets. In the region between the transverse wall and the front of the material rods not to be cut smooth, a sensor for the material rods is arranged on the conveyor belt; on actuation of this sensor an auxiliary program for the cutting machine can be switched on according to which the material rods is initially cut smooth, the main program which determines the parts to be cut off being temporarily by-passed. In this case the sensor can be a light sensor and associated light source arranged in the material supporting region on the conveyor, which light sensor responds on interruption of a light ray, when a material rod is pushed on to the conveyor. The same light sensor, whenever a material rod returns to the pallet from working, can ensure that this material rod, which certainly need no longer be cut smooth, can be brought into the pallet in such a way that its front has the desired spacing from the transverse wall of the pallet. This can take place due to the fact that the conveyor belt is stopped at the moment when the material rod leaves the vicinity of the light sensor again after passing it, in its return from the cutting machine.

For the case where parts which are to be processed still further, that is for which smooth cutting of the material rods is not necessary, are to be cut to length on the cutting machine, the data carrier of the corresponding pallet can expediently carry an additional code to effect by-passing the function of the light sensor. This code of course can equally expediently be provided on the punched cards or the like which carry the orders for the cutting machine.

For the cases where the last material is taken from a pallet, it has proved advantageous that the data carrier of the pallets contains an additional code to effect the comparison of the weight of the pallet content with an ideal minimum weight or reference value, the weight of the pallet content being derived from the lifters carrying this content or the pressure prevailing in their cylinder-piston units. The work on the material contained by the pallet is interrupted by the action of this code, or another pallet with similar material is brought, when the weight falls short of a reference value set to the minimum content of a material rod and the material available on the cutting machine is consumed, although there are still parts to be cut off from this material. It can further be provided that by the action of this code the near emptiness of the pallet is indicatable, so that provision can be made in good time for its refilling.

The respective data carriers can be arranged on the already mentioned transverse wall of the respective pallets and can be a horizontal punched strip extending transversely of the longutidinal direction of the pallets, pins can be screwed into individual holes of this strip according to the material situated in the respective pallet and end contacts of the scanning device of the withdrawal station can be operable by these pins.

In order to avoid difficulties which can occur due to incorrect setting of the data carrier, for example omission of a working value, or by a defect on the contacts exploring the pins, it is expedient if on the occurrence of such an error the working values of the cutting machine are automatically set to minimum values, admittedly with the exception of the clamping pressure to be applied by the clamping means for the material, which in such a case must be especially high specifically in order to avoid accidents.

According to preferred embodiments of the invention, the conveyor is inclined transversely of its longitudinal extent, and a vertical guide rail extends beside its lower longitudinal edge between the withdrawal station and the cutting machine. A part of the guide rail extending into the region of movement of the means of the cutting machine for material feed is hingeable out of this range of movement.

Furthermore in accordance with a preferred embodiment of the invention an ejector for material residues can be arranged on the conveyor between the withdrawal station and the cutting machine. The ejector can be actuatable by two material sensors arranged in the longitudinal direction of the conveyor side by side, whenever in the passage of the material the sensors are not energized at least once substantially simultaneously by the material being returned. The sensors are expediently light sensors and the ejector includes a part of the guide rail which is displaceable by a cylinder-piston unit transversely of the longitudinal direction of the conveyor over the conveyor. By these means an optical measurement of length takes place for the material rods returning in the direction towards the associated pallet from the cutting machine after use, in order to sort out those material pieces the storage of which is no longer worthwhile, because only a few parts or none at all can still be cut off from them. The critical length of these material residues can be adjusted to the desired amount in a simple way by the interval between the light sensors measured in the conveying direction.

The means of the cutting machine for material feed can include a material sensor and this sensor can interrupt the work of the cutting machine and additionally cause the removal of the material residue by means of the conveyor belt and the ejector and also cause the subsequent supply of a further material rod. It is advantageous in this case for the means of the cutting machine for material feed to be clamping jaws which are displaceable in the longitudinal direction of the conveyor and transversely thereto. At least one of these clamping jaws carries a flap connected with a contact and which actuates the contact by a force constantly loading the flap when there is no material between the clamping jaws. In this case, the ejector acts without having to be energized for this purpose by the contact connected with the flap, for the material sensors connected with the ejector, that is the two light sensors, will in every case have an interval which is greater than the material length which still remains when the clamping jaws which effect the material feed receive no more material to grasp.

On the part of the cutting machine which carries the actual cutting tool and shifts it in relation to the workpiece a sensor can be arranged in such a way that it comes into contact with the material before the cutting tool, in the feed direction, and the sensor can operate a contact by which the speed of feed of the machine part is variable. Such a sensor provides the possibility of advancing the cutting tool, in the working of a new material cross section, from the initial position of maximum distance from the workpiece towards the workpiece by high speed feed, which is then switched over on striking of the sensor upon the workpiece to the feed speed which is determined by the data carrier of the pallet from which the material has been transported. When then a part is cut off from the material rod, the return stroke of the cutting tool can be terminated by the sensor at the moment when the sensor clears the workpiece, so as to avoid unnecessary idle travel of the cutting tool in the working of a material cross section.

The sensor can protrude beyond the front edge of the cutting tool by a small amount at the moment when it comes into contact with the material or clears the material so that the lifting of the cutting tool above the workpiece cross section is not inadequate. For the cases where the movement of the cutting tool out of the cross-sectional region of the material for the further material feed is terminated by the sensor, the actuation of the contact involved is delayed. Firstly, a time-delay relay is activated which causes or allows the lift-out movement for the cutting tool to continue for a few seconds more.

Each time when a new material rod is fed to the cutting machine it is especially advantageous that the material is moved by the conveyor against a stop of the cutting machine engageable for this purpose, which stop is aligned with the side of the cutting tool facing the material. The correct abutment of the material on the stop is checkable before the beginning of the work of the cutting machine by a sensor which switches on the conveyor anew in the case of an incorrect abutment. This avoids the possibility of the material rod, which may strike with some force upon the stop, rebounding somewhat from the stop and then not being situated in the correct abutment position. Here again, the sensor may be, for example, a light sensor and an associated light source which switch on the conveyor briefly once again if the material is not as required, abutting on the stop. For the case of high feed speeds of the conveyor it can also be favorable to switch the conveyor speed to a slower, creeping rate before the material rod strikes upon the stop, which likewise can be effected for example, by a light sensor and an associated light source arranged at some distance from the stop, in order to protect the stop against damage.

At least one shelving unit may include a bay for charging with filled pallets. If there are several rows of shelving units, it is expedient that these should each include a bay aligned with the charging bay in the longitudinal direction of the pallets and that the charging bay in each case should be automatically drivable into these bays. In this case, the charging bay is mobile over guide rails and connected by these with the bays aligned with it, the guide rails being interrupted in the region of the movement of the U-arms of the transport devices. The charging bay cooperates with the guide rails in such a way that it is always guided horizontally despite the interruption of its rails. For this purpose the charging bay can be mobile on the rails by means of at least three pairs of rollers having axis of rotation arranged, in each case, in one common vertical plane.

BRIEF DESCRIPTION OF THE DRAWINGS

FIGS. 7 to 10 are detail views of portions of a pallet suitable for use in the present invention.

FIG. 11 is a plan view of a conveyor suitable for use in the present invention.

DESCRIPTION OF THE PREFERRED EMBODIMENTS

The drawings illustrate the invention in very diagrammatic form, in order to make the illustration clearly and readily comprehensible. For this reason details are illustrated frequently only in one of the figures, although such details per se would also be visible in other view if such views were ordinary working drawings.

Figure 1:
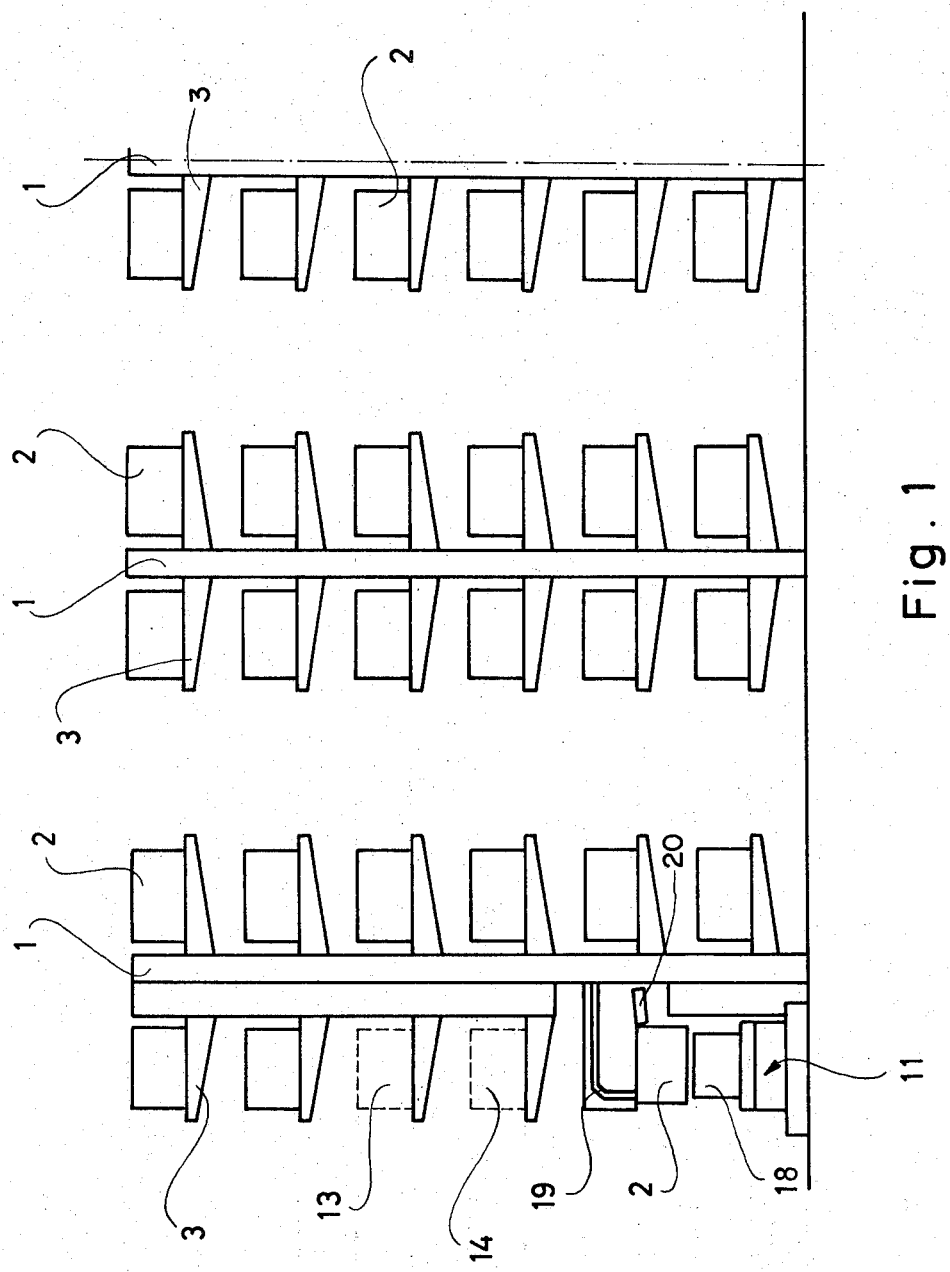
FIG. 1 is a diagrammatic view of the narrow side of shelving units including a withdrawal station in accordance with an illustrative embodiment of the present invention.
Figure 2:
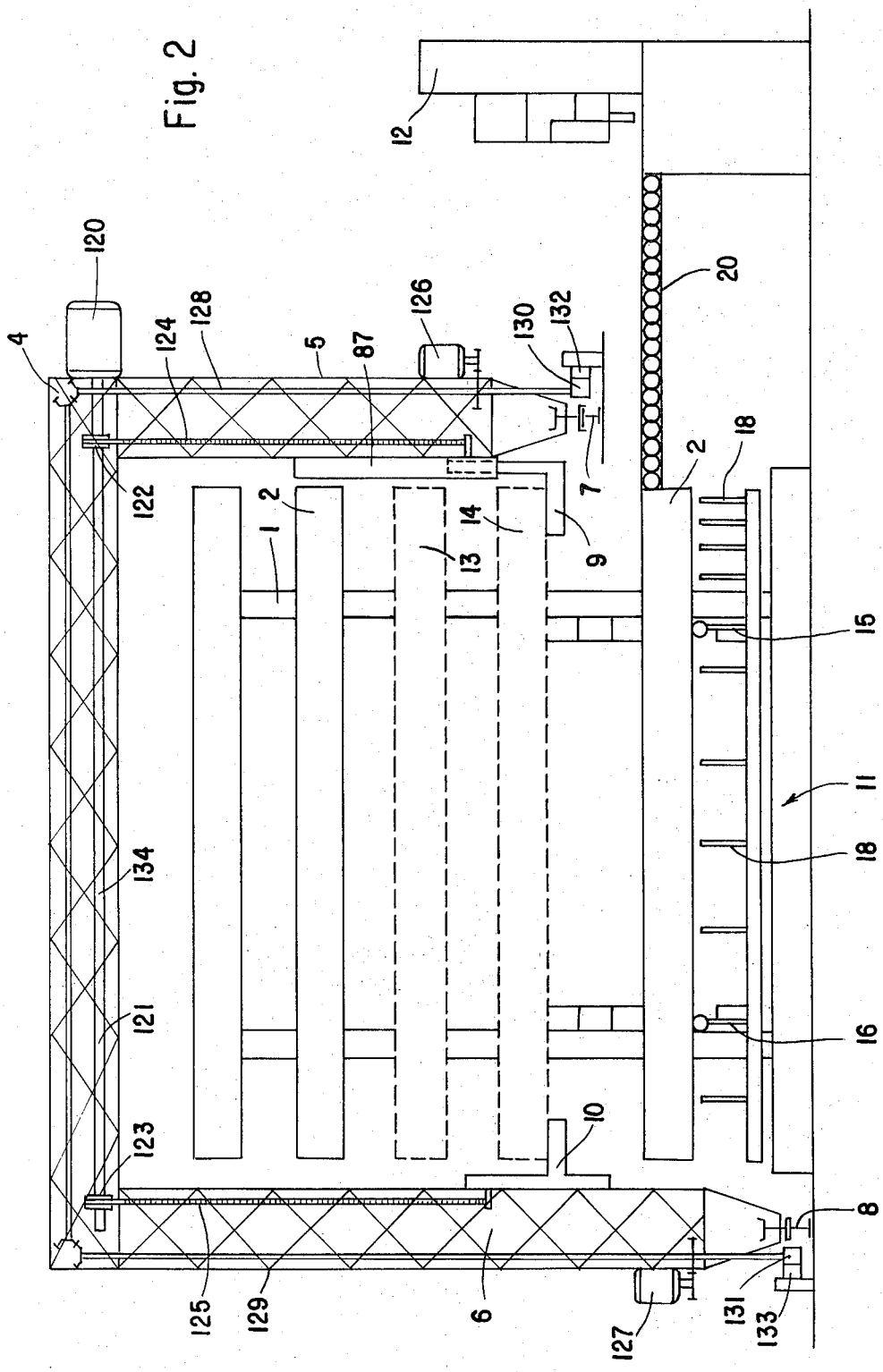
FIG. 2 is a diagrammatic view of the side of the arrangement of FIG. 1 showing the shelving unit, the withdrawal station, a transport device, a conveyor and an associated cutting machine according to the present invention.

As illustrated in FIGS. 1 and 2, the apparatus according to the present invention includes shelving units formed of vertical supports 1 on which the bays are formed by horizontally extending arms 3 attached to the vertical supports 1. The arms 3 are secured on both sides of the vertical supports and point transversely of the longitudinal extent of pallets 2, as supports for the pallets 2. The arrangement of the vertical supports 1, in relation to the pallets 2, as visible in FIG. 2, ensures that the arms 3 are situated inboard at a distance from the longitudinal ends of the pallets 2.

A mobile transport device in the form of a U-shaped framework 4 is movably positioned over the shelving units, the downwardly extending arms 5 and 6 of the U-shaped framework 4 are movably supported on two tracks 7 and 8 extending horizontally beside the shelving units. So that the transport device can also travel over the region of a material rod conveyor 20, the track 7 is spaced above the conveyor 20 and the arm 5 of the transport device is correspondingly shorter than the arm 6. On each of the downwardly extending arms 5 and 6 are respectively mobile arms 9 and 10 which extend horizontally and in the longitudinal direction of the pallets 2. The arms 9 and 10 are displaceable vertically, the displacement movements of the arms 9 and 10 of course being synchronized so that, at any given time, they are always situated at the same level. The mobile arms 9 and 10 extend into the region of the pallets 2 in such a way that they are movable out of the free space between the shelving units to beneath the pallets 2. So that the arm 9 of the shorter U-arm 5 can also reach the lower bays of the shelving units, its guide carriage 87 is correspondingly elongated in the feed direction. Within the guide carriage 87, the arm 9 is freely displaceable in a vertical direction, i.e. in the lifting movement at first in the guide carriage 87 upwards from the position shown in FIG. 2 and then engaging the upper end thereof for pushing it further up, and correspondingly in the lowering counter-movement.

The arms 9 and 10 are displaced by a motor 120 having a shaft 121 with two sprockets 122 and 123 that carry chains 124 and 125 attached to the arms 9 and 10, respectively. Drive power is transmitted to the framework 4 by motors 126 and 127 drivingly connected to shafts 128 and 129, respectively, which bear pinions 130 and 131 in mesh with racks 132 and 133, respectively. These racks are both geared to a junction shaft 134 for synchronizing the shafts 128 and 129.

In order to convey the pallets 2 into a withdrawal station or bay, designated generally by 11, the arms 9 and 10 are driven out of the free space between the shelving units laterally to beneath the free ends of the pallets 2. Thereupon the pallets 2 are lifted by the arms 9, 10, and driven with the aid of the transport device 4 into the free space between the shelving units, lifted in this space to above the uppermost pallets in the shelving units, then lowered beside the withdrawal station 11 and driven laterally into the latter.

In order to keep the stoppage times for the cutting machine 12 as short as possible it has proved expedient to provide two free bays 13 and 14 above the withdrawal station or bay 11. These serve so that while the cutting machine 12 is still working a pallet 2 with the material to be worked next is brought into the free bay 13. If then the working of the previous material is terminated, its pallet 2 is firstly brought out of the withdrawal station or bay 11 into the free bay 14 and the pallet situated in the bay 13 is brought into the withdrawal station or bay 11. The cutting machine 12 can already be charged with the new material and while it is working, on this material sufficient time remains for the transport device 4 to bring the particular pallet 2 situated in the bay 14 back to its storage position and to transport the particular pallet 2 with the material for the next working operation into the bay 13.

The withdrawal station or bay 11 includes essentially two supports 15 and 16 with which the respective pallets 2 can be lifted against stops of the withdrawal station 11, a bridge member 17, vertical lifter plates 18 which pass through suitable bottom openings in the pallets 2 and can lift the material contained therein above the upper edge of the pallets, and push members 19, one being visible in FIG. 1, which can transport the material lifted out of the pallets 2 on to the conveyor 20 which conveys it then to the cutting machine 12.

Details of the withdrawal station or bay may be seen in FIGS. 3 to 7. For parts thereof already mentioned with reference to FIGS. 1 and 2, the same reference numerals are used again in FIGS. 3 to 7.

Figure 3:
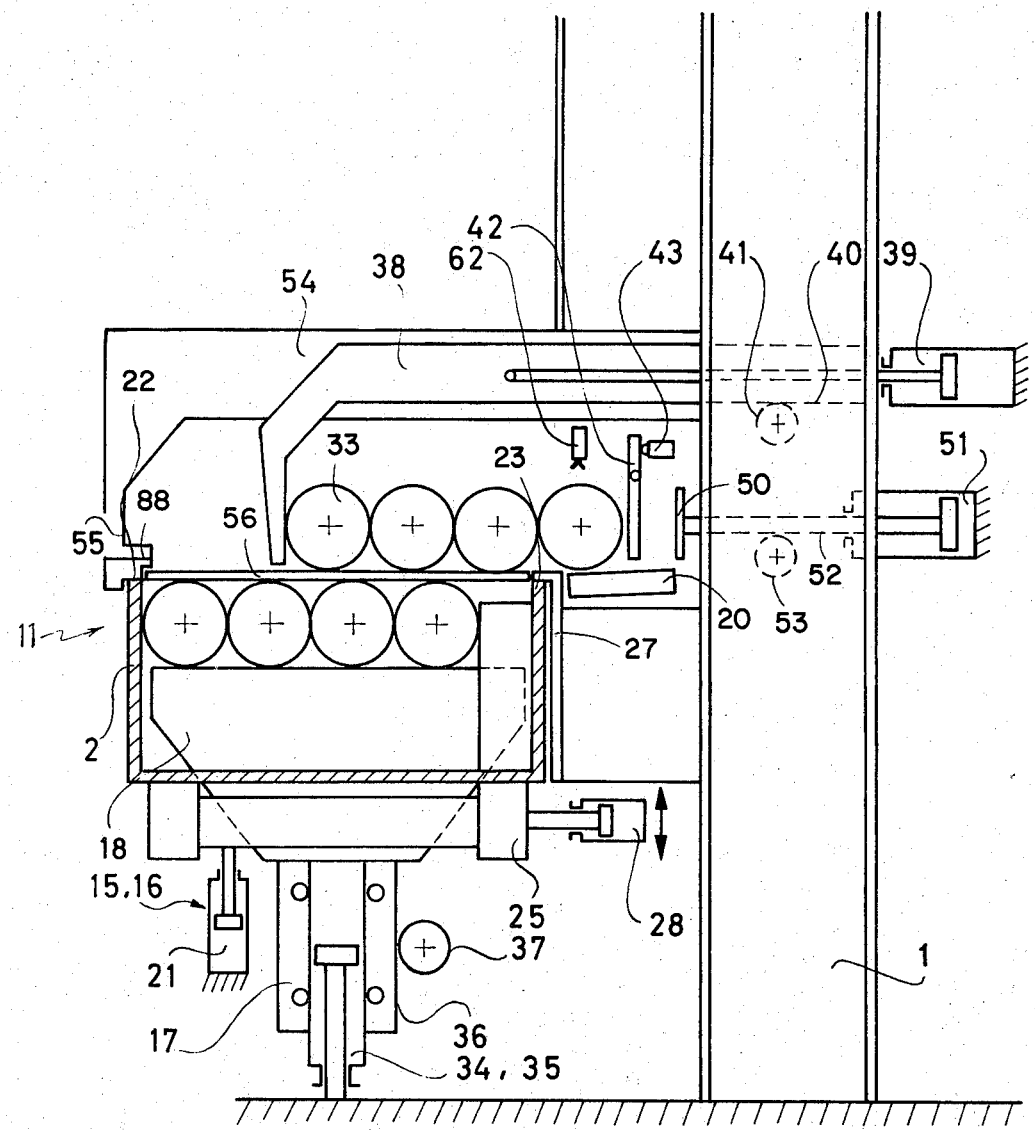
FIG. 3 is a cross-sectional view of a withdrawal station suitable for use in the present invention.

According to FIGS. 3 and 7 each of the supports 15, 16 is vertically displaceable by a cylinder-piston unit 21, so that each pallet 2 when placed upon the supports 15 and 16 can be lifted against a pair of stops 22 and 23 of the withdrawal station or bay 11.

So that the pallets 2 come to stand correctly on the supports 15, 16 in the longitudinal direction also, the pallets 2 have recesses 24 on their undersides, in which the supports 15, 16 can engage with respective rollers 25 carried by them, as best viewed in FIG. 7. The recesses 24 are here so arranged that the rollers 25 abut practically without play on the vertical walls 26 of the recesses lying between them. If a pallet 2 should be placed somewhat offset in the longitudinal direction upon the rollers 25, so that for example the roller 25 visible in FIG. 7 strikes upon the edge downwardly limiting the wall 26, this has the result that this pallet 2 slides on the particular roller 25 by virtue of its own weight and on account of the rotatability of the rollers 25, whereby adjustment in the longitudinal direction is achieved.

To adjust the pallet 2 in the withdrawal station 11 transversely of the longitudinal direction also, an abutment wall 27 is provided against which the pallet 2 is moved due to the fact that the axle on which the rollers 25 as situated is displaceable by a cylinder-piston unit 28, the cylinder-piston unit 28 being raisable and lowerable with the rollers 25.

Figure 5:
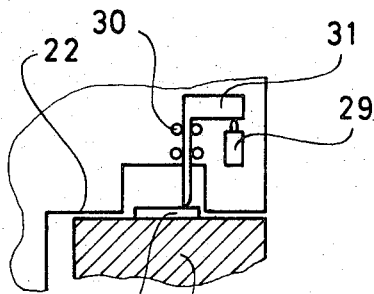
FIG. 5 is a detail view of a portion of FIG. 4 to an enlarged scale.

When a pallet 2 is positioned against the stops 22, 23 and the abutment wall 27, end contacts are opened which effect the switching off of the supply of pressure medium to the cylinder-piston units 21 and 28. Such an end contact is illustrated in FIG. 5, which shows the stop 22 in enlarged representation, according to FIG. 4 in combination with FIG. 3. On the stop 22 an end contact 29 is secured which is normally loaded by a bell-crank lever 31 freely movable vertically in rollers 30. If any one of the pallets 2 is driven against the stop 22, the bell-crank lever 31 is lifted by the upper edge 32 of this pallet 2, so that it frees or opens the contact 29. This arrangement serves to prevent destruction of the end contact 29 if for any reason the shutting off of the pressure-medium supply for the cylinder piston units 21 should not be possible.

A corresponding arrangement is provided for the abutment wall 27 in combination with the cylinder-piston units 28, but there admittedly provision must be made, for example by spring loading of the bell-crank lever 31 in the direction towards the end contact 29, so that the end contact 29 is loaded when no pallet 2 is positioned against the abutment wall 27.

If a pallet 2 is inserted in the manner as described into the withdrawal station or bay 11 (FIG. 3), material rods 33 carried by this pallet 2 can be lifted out. The bridge 17 visible in FIGS. 3 and 6, which is vertically movable by cylinder-piston units 34 and 35 and carries the vertical lifter plates 18 which can pass through the corresponding bottom openings of the pallets 2, serves for this purpose. In order to ensure synchronism of the movements generated by the cylinder-piston units 34 and 35, these can for example also move a rack 36 which meshes with respective pinions 37, the pinions 37 allocated to the cylinder-piston units 34 and 35 being mounted on one common shaft.

Due to the fact that the lifter plates 18 can pass through the bottom openings of the pallets 2, they lift the material rods 33 until a layer composed of the material rods 33 is situated in a plane above a pallet 2 positioned in the withdrawal station or bay 11. Then the material rods 33 can be brought by at least two push members 38, arranged one behind the other in relation to FIG. 3, on to the conveyor 20 which is situated parallel with and beside the pallet 2 to be unloaded. The push members 38 can likewise again be moved by cylinder-piston units 39, the synchronism of which is ensured by a movement-accompanying rack 40 and a pinion 41 meshing therewith, the pinions allocated to the push members 38 being arranged on one common shaft mounted on the supports 1.

In order to ensure that the push members 38 bring only one material rod 33 on to the conveyor 20 at any one time, above the conveyor 20 a pivotable stop 42 is provided which in a pivoting movement caused by abutment of a material rod 33 frees or opens a contact 43, whereby firstly the pressure medium supplied to the cylinder-piston unit 39 is blocked and thus the movement of the push members 38 terminates. This movement is switched on again only when a material rod 33 supplied in this way to the cutting machine 12 (FIG. 2) is consumed and still further material is required.

Figure 4:
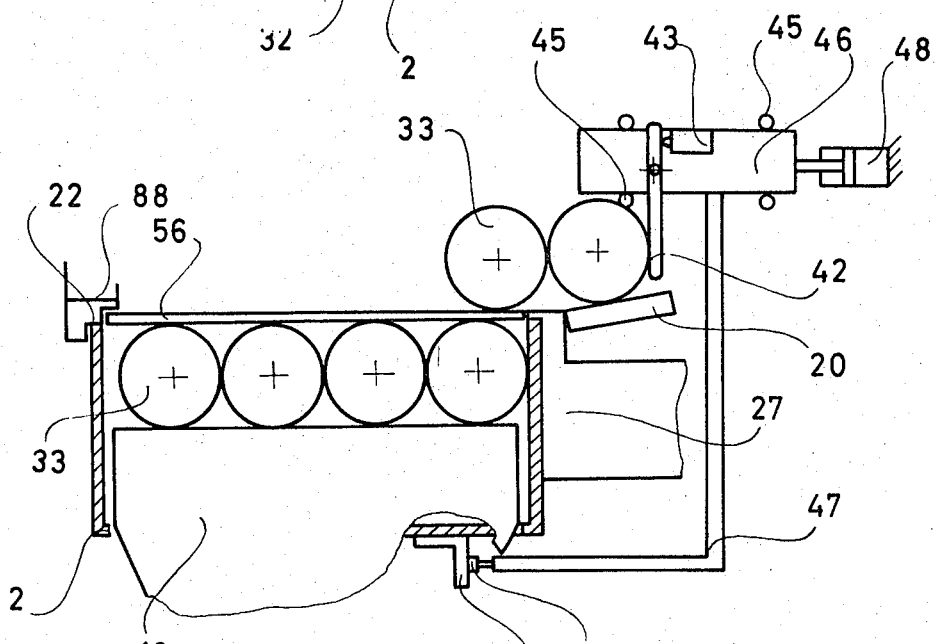
FIG. 4 is a detail view of a portion of FIG. 3 to an enlarged scale.
Figure 6:
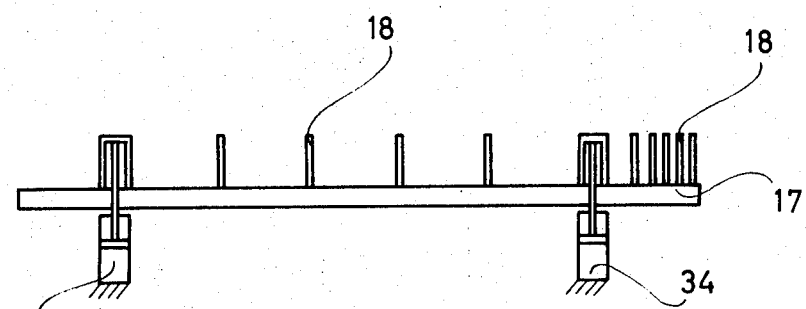
FIG. 6 is an elevational view of a component of the arrangement shown in FIG. 3.

From FIG. 4 it may be seen in detail how the setting of the pivotable stop 42 to the cross section of the material contained in the respective pallets takes place. For this purpose, on the bottom of each of the pallets 2 a further stop 44 is adjustably secured. On the other hand the stop 42 and the contact 43 are arranged on a plate 46 which is displaceable on rollers 45 on the withdrawal station or bay 11. The plate 46 also carries an arm 47 which bears against the stop 44. Finally the plate 46 is loaded by a constantly charged cylinder-piston unit 48 in such a way that it constantly seeks to carry out a movement in the direction towards the pallet 2 which is in the withdrawal station or bay 11.

If a pallet 2 is inserted into the withdrawal station or bay 11, the arm 47 moves against the stop 44 and is displaced together wtth the plate 46 against the action of the cylinder-piston unit 48 until the pallet 2 is seated before the abutment wall 27. Thus the stop 42 is brought exactly into such a position that of the material rods 33 contained at the time in the pallet 2 only one rod can be brought on to the conveyor 20 at any given time.

If desired, the free end of the arm 47 can be formed by an adjustable screw 49 by which a fine adjustment can be achieved for the stop 42. Moreover, the cylinder-piston unit 48 can also serve to drive the stop 42, as seen in FIG. 4, to the right out of the region of the conveyor 20 when the conveyor 20 is running, so that the stop 42 cannot be damaged by any of the material rods 33.

If any one of the material rods 33 returns from the cutting machine 12 (FIG. 2) then according to FIG. 3 at least two push members 50 arranged one behind the other serve to push such a material rod 33 from the conveyor 20 back again into the pallet 2 then in place. For this purpose the push members 50 are actuated by cylinder-piston units 51 which again move a rack 52 with them, to produce synchronism for the push members 50, which rack meshes with pinions 53, the pinions 53 allocated to the two push members 50 being arranged on one common shaft mounted on the supports 1.

It is common to the push members 38 and 50 that they have in the region of their contact with the material rods 33 a plate (not shown) connecting them, so that it is possible to move even those of the material rods 33 which are shorter than the distance of the push members 38 and 50 from one another measured perpendicularly to the plane of FIG. 3. For this purpose the plate 54 carrying the stop 22 has a recess 55 into which the plate connecting the push members 38 can enter when the push members 38 are driven into the extreme left position as viewable in FIG. 3. It is to be understood, on the other hand, that the push member 50 visible in FIG. 3 is three-dimensionally disposed behind the stop 42.

As may be seen for example in FIGS. 3 and 4, where several layers of the material rods 33 are provided in one pallet 2, respective plates 56 are provided respectively between these layers. The plates 56 must be ejected after the consumption of the then upper material layer, before the next succeeding material layer can be lifted out of the pallet 2 in the withdrawal station or bay 11. The push members 38 can serve for this purpose on their return movement into the left extreme position as viewable in FIG. 3, in which they can contact the plates 56 with downwardly directed extensions (not shown) of the plate interconnecting them.

So that the plates 56 can come past the stops 22, the plates 54 carrying these are provided with recesses 88. The limitation of the recesses 88 can serve at the same time to secure the plates 56 against tipping up, if as may be seen from FIG. 4 only one material rod 33 lies on one longitudinal side of the pallet 2 being unloaded. Beside the withdrawal station or bay 11 there can stand an expediently outwardly movable trough into which the injected plates fall. The ejection of the plates 56 requires special preparation, since the plates 56 must firstly remain in a position which permits the push members 38 and the plate connecting them to travel away over the plates 56 in order to push individually the material rods 33 on to the conveyor 20. If the last material rod 33 is pushed on to the conveyor, a contact (not shown) carried by the push members 38 can run against a stop which by means of the central program control system causes the lifting out of the plates 56 when this particular material rod 33 has been consumed in the cutting machine 12 and when, nevertheless, still further parts are required from the material being worked at that time. The lifting out of the plates 56 then takes place by the cylinder-piston units 34, 35, and an end contact likewise carried by the push members 38 or the plate connecting them, against which contact at least one of the plates 56 runs in lifting out, can ensure that the lifting out movement corresponds to the thickness of the plates 56.

If thereafter the plates 56 have been ejected by movement of the push members 38, these are situated in the extreme left position as viewable in FIG. 3, so that the next material layer can be lifted out and further material rods 33 can be pushed on to the conveyor 20.

FIG. 8 illustrates that the pallets 2 are closed off at the front, that is on the side facing the cutting machine 12 (FIG. 2), by an upstanding transverse wall 57. The transverse wall 57 carries a horizontally extending perforated strip 58 into which pins 59 can be screwed.

Correspondingly, the perforated strip 58, on the withdrawal station or bay 11 (FIG. 2) there is a housing 60 in which, as visible in FIG. 8, as many end contacts 61 are arranged one behind the other as the pins 59 which can be possibly and selectively associated with the perforated strip 58. These end contacts 61 are in communication with the program control system for the cutting machine 12 (FIG. 2), so that by insertion of appropriate pins 59 into the perforated strip 58 in values of selected operating parameters can be preset and predetermined for the cutting machine 12 which are dictated by the material contained in the individual pallets 2. These parameters are essentially the cutting speed, cutting pressure, feed speed and clamping pressure. Thus these parameters are automatically set whenever an individual pallet 2 is inserted into the withdrawal station or bay 11 (FIG 2).

In addition on the perforated strip 58 a code can be provided which determines a minimum weight of the pallet content, this weight being compared by means of the central program control system with the current actual weight of the pallet content, which can be derived indirectly from the pressure prevailing on the cylinder piston units 34 and 35. If the weight of the pallet content falls short of this set minimum value, this is an indication that the pallet 2 then in place is empty or contains only very little material still, so that by means of the central program control system another pallet 2 containing this material can be brought forward or at least that the emptying or near-emptying of the pallet 2 then in place can be indicated. On falling short of the minimum weight for the pallet content the cutting machine 12 (FIG. 2) can also be shut off by the central program control system, whenever the material rod 33 last being worked has been consumed.

FIG. 9 shows the plan view of a pallet 2 in the region of the transverse wall 57. As may be seen the material rods 33 have not been uniformly inserted. The reason is that new material rods 33 must first be cut smooth on their forward end. Therefore these new material rods 33 are inserted so as to abut against the transverse wall 57, while the upper material rod 33 visible in FIG. 9 has already been worked, that is it has a smooth front end intentionally positioned spaced from the transverse wall 57. If from the pallet 2, as illustrated in FIG. 9, the first material rod is pushed on to the conveyor 20, at this moment a light sensor, indicated generally by the numeral 62, arranged above the conveyor 20 in the region of the distancing of this material rod from the transverse wall 57 (see FIG. 3) is not actuated, so that by means of the central program control system it is determined for the cutting machine that the material can be taken into a final work position immediately, that is to say does not have first to be cut smooth.

When this first material rod 33 is consumed and the next material rod is drawn from the pallet represented in FIG. 9, an interruption of the light ray to the light sensor 62 takes place, so that for this next rod 33 firstly the main program is temporarily disabled for the cutting machine 12 (FIG. 2) and an auxiliary program is activated according to which a piece, for example of 20 mm, is cut from the new material rod 22 for the purpose of cutting it smooth. Then the regular main program is again enabled for the cutting machine 12 and the desired parts are cut from this new material rod 33.

The light sensor 62 serves additionally to determine the position of the material rods 33 returning from the cutting machine 12 (FIG. 2) into the pallets 2 in such a way that these rods 33 are spaced with their front ends from the transverse wall 57 of the respective pallets. For this purpose the conveyor 20 returning the material is halted only whenever the returning material rod 33 has run through beneath the light sensor 62 and clears the latter again.

In FIG. 10 an arrangement for adapting the cross section of the pallet 2, shown in FIG. 10, to the cross section of the material rods 33 if the latter cannot completely fill the width of the pallet 2. For this purpose a pair of spacers 63 can be secured to an upstanding wall of the pallet 2 in such a way that they lie outside the region of movement of the plates 56 and of the lifter plates 18 (see for example FIG. 6).

Figure 12:
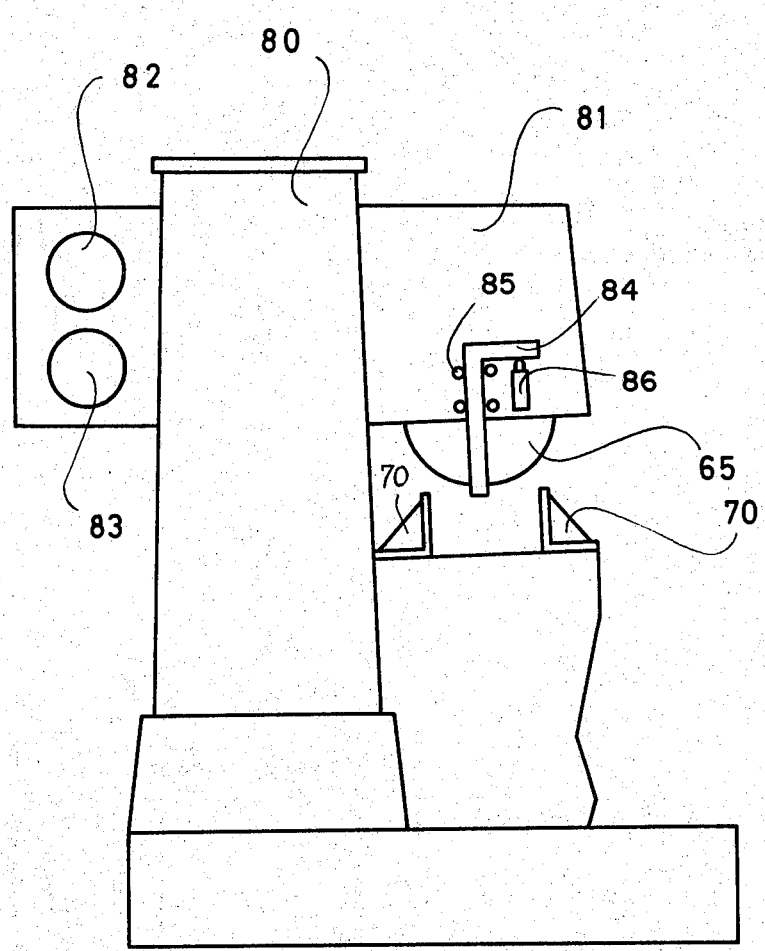
FIG. 12 is a lateral elevational view of a cutting machine which can be fed in accordance with the present invention.

FIG. 11 shows the plan view of the conveyor 20 in the region between the withdrawal station or bay and the cutting machine 12, the superstructure of the cutting machine illustrated in lateral elevation in FIG. 12 being omitted for purpose of clarity so that only a plane just above the conveyor 20, which carries the material rods 33 (not shown in FIG. 11), is visible in FIG. 11.

According to FIG. 11 the material rod brought by way of the conveyor 20 to the cutting machine 12 runs firstly against a stop 64 which is drivable into the conveying path and lies in the plane of the cutting tool, for example a circular saw blade 65 visible in FIG. 12. So that the material does not run with excessive speed against the stop 64, but on the other hand the transport speed of the conveyor 20 does not have to be made too low, shortly upstream from the stop 64 a light sensor 66 is provided under the control of which the speed of the conveyor 20 is reduced on passage of material. A further light sensor 67 ascertains whether the material rod also comes to abut flush against the stop 64. Otherwise the conveyor 20 is switched on again briefly under the control of the light sensor 67 in order to move the material rod wholly against the stop 64.

When this has taken place clamping jaw 68, which are displaceable transversely and longitudinally of the conveyor 20 and which were hitherto driven apart entirely, close and push the material rod forward by an amount corresponding to the length of the part to be cut off, the stop 64 naturally having first been removed from the direction of movement of the material. Then additional clamping jaws 69 and 70, which hitherto likewise were driven fully apart, close and the cutting operation commences. According to the arrangement of the program controlling the cutting machine 12, now the clamping jaws 68 can open and move to the left in FIG. 11 by the length of the part to be cut off next, even during the working of the circular saw blade 65 (FIG. 12); however, this movement can take place equally well after the cutting operation is terminated.

As may be seen for example from FIG. 3, the conveyor 20 is somewhat inclined transversely of its longitudinal direction so that a vertical guide rail 71 arranged beside the conveyor at its lower longitudinal edge is provided, along which the material rods can slide. So that this guide rail 71 does not hinder the clamping jaws 68, its part 72 is hingeable out of the path of movement of the jaws 68, while these are carrying out the feed movement for the material rods 33.

When the desired number of parts has been cut off from the material rod being worked at a given time, the conveyor 20 switches itself on in the reverse direction in order to transport the material rod residue back into the withdrawal station or bay 11. If however the material rod residue has only a length for which further storage is no longer economical, it is ejected shortly before reaching the withdrawal bay. For this purpose an ejector is provided which, according to the example as illustrated in FIG. 11, includes a movable member 73 which is part of the guide rail 71, and which is movable by means of a cylinder-piston unit 74 transversely of the longitudinal direction of the conveyor 20 over the latter, so that the material rod residue is pushed into a container 75.

For enabling the ejector 73, 74 two light sensors 76 and 77 which are arranged to operate only when the conveyor 20 is running backwards toward the withdrawal station or bay 11, are provided. The distance between the light sensors 76 and 77 corresponds to the material rod length which is critical for the question of further storage of a material rod residue. If both light sensors 76 and 77 detect the disappearance of light simultaneously at least once by a material rod residue moving back in the direction towards the withdrawal station or bay 11, the ejector 73, 74 does not come into action. If however the light sensor 76 is already cleared before the material rod residue reaches the light sensor 77, then this actuates the ejector 73, 74 and the material rod residue is removed, the conveyor 20 being simultaneously halted temporarily.

If parts having a total length exceeding the length of one material rod 33 are to be cut of one sort of material the moment is reached when the material rod 33 being cut is consumed and the clamping jaws 68 in a renewed feed movement receive no more material to grasp. At this moment likewise the conveyor 20 is set in motion in the reverse direction, which is effected by a flap 78 on at least one of the clamping jaws 68, connected with an end switch, which flap 78 is normally pushed by the material rods 33 against the associated clamping jaw, but is immediately suddenly pivoted away from this clamping jaw by appropriate spring loading at the moment when no more material is situated between the clamping jaws 68. A material rod residue moved back in the direction of the withdrawal station or bay 11 in this way is also removed by the ejector 73, 74, since its length is less than the interval of the light sensors 76 and 77.

FIG. 12 shows the lateral elevation of the cutting machine 12, which includes the cold circular saw 65, looking towards the withdrawal station or bay. The clamping blocks 70 are shown. Other parts of the installation not pertaining directly to the operation of the cutting machine 12 are omitted for better clarity of illustration.

A cutting tool carriage 81 is vertically displaceable on a vertical pedestal 80, the displacement movement being driven by a motor 82 accompanying the movement of the tool carriage 81, while a motor 83 serves as the drive of the circular saw 65. The tool carriage 81 also carries a feeler 84, in the region of the blade of the circular saw 65, in the form of an angle piece which is vertically displaceably guided by means of rollers 85 and in its lowest position loads an end contact 86. The lower end of the feeler 84 extends somewhat deeper than the blade of the circular saw 65.

If a fresh material rod is clamped into the cutting machine 12, the tool carriage 81 travels out of its uppermost position, which it initially always automatically assumes in change of material, downwards in high speed feed, until the feeler 84 touches the material rod 33 to be cut and in doing so frees or opens the end switch 86. At this moment the feed speed of the tool carriage 81 is changed to the feed speed determined by the data carrier fitted on the pallet 2 from which the material rod 33 then in place for cutting has come, and the cutting operation takes place, the feeler 84 being able to slide higher on the tool carriage 81 with increasing feed thereof.

When the cutting operation is terminated and if still further parts are to be cut from the clamped-in material rod 33, the feeler 84 in combination with the end contact 86 takes over the taks of controlling the terminating of the return stroke of the tool carriage 81 at the moment when the feeler 84 again loads the end contact 86, thus the circular saw 65 is removed out of the cross-sectional region of the material rod 33 being cut. In this way unnecessary traveling of the tool carriage 81 can be avoided in a simple way. In order to ensure that the circular saw 65 has an adequate spacing from the material cross section, so that it cannot be damaged in the follow-up pushing of the material rod 33, the end contact 86 can be coupled with a time delay relay which allows the return movement of the tool carriage 81 for a few seconds.

A further embodiment of the present invention is described with reference to FIGS. 13 to 18, parts already described with reference to FIGS. 1 to 12 being provided with the same reference numerals as therein.

Figure 13:
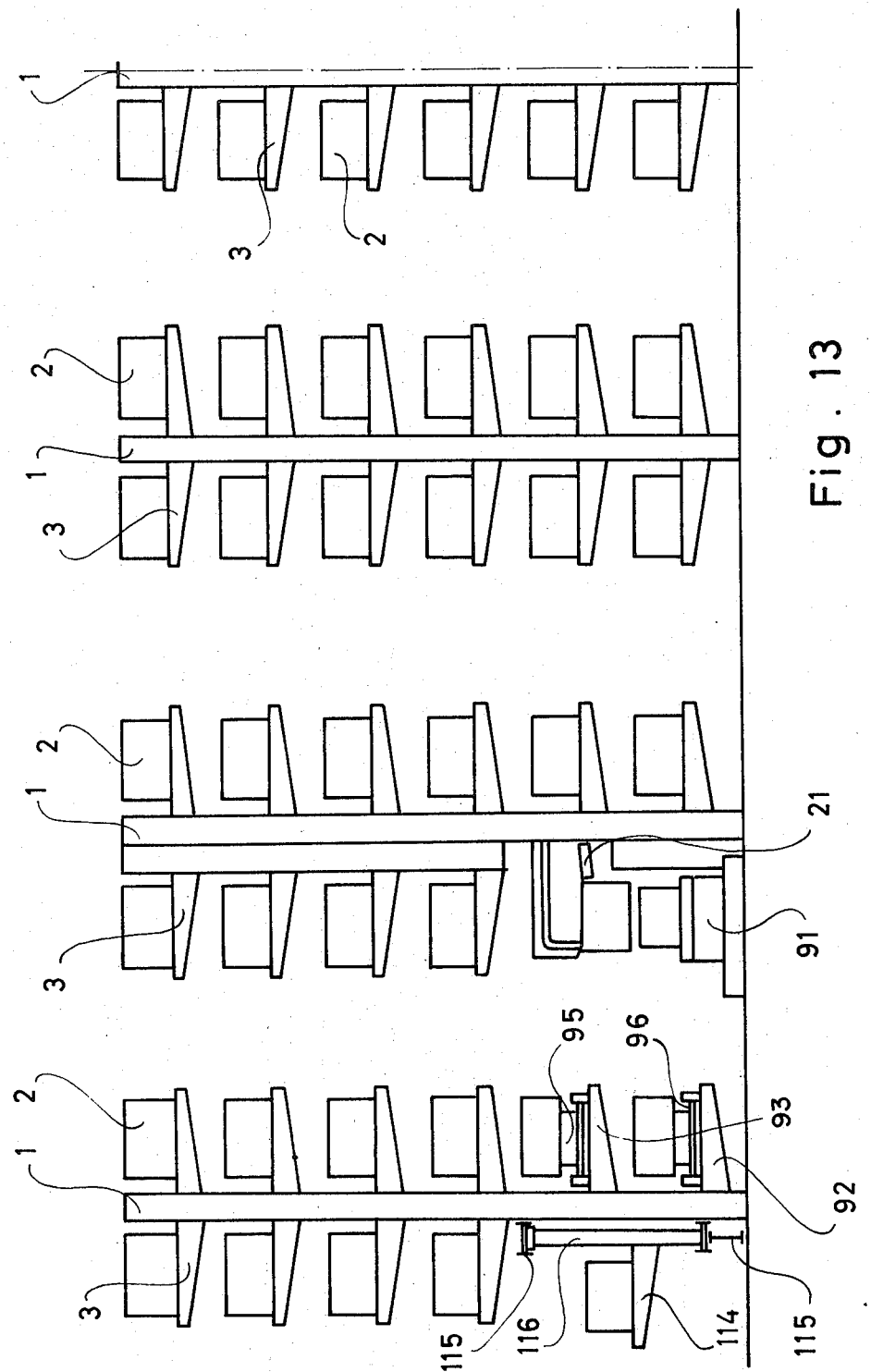
FIG. 13 is a side elevational view of a row of shelving units of a further embodiment, several shelving unit rows being visible.
Figure 14:
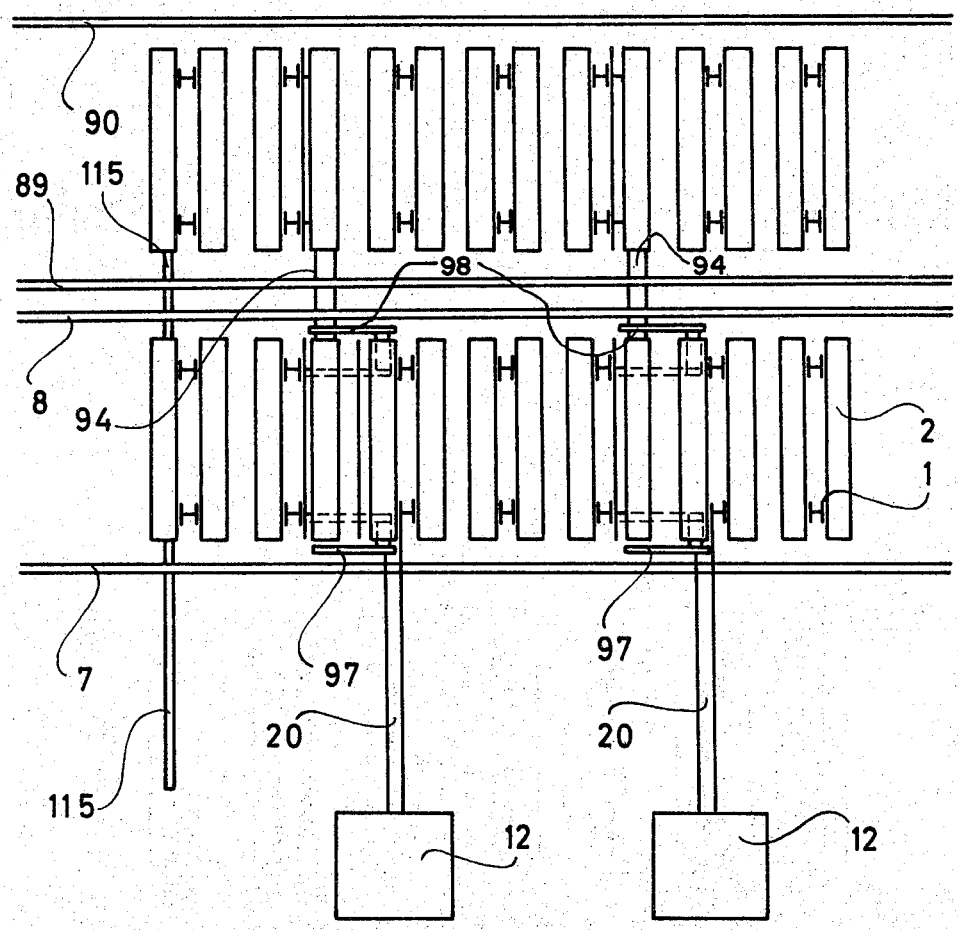
FIG. 14 is a plan view of the apparatus shown in FIG. 13.

According to FIGS. 13 and 14 in this example two rows of shelving units, formed by vertical supports 1 and horizontally extending arms 3, are arranged side by side, the arrangement being made such that the bays of shelving units 1, 3 standing side by side in the longitudinal direction of pallets 2 are aligned with one another. For the shelving row added a separate mobile transport device, constructed as the transport device 4, 5 (FIG. 2), is provided on tracks 89 and 90 and can be moved over these tracks. Tracks 7 and 8, corresponding to the tracks having the same numerals in FIG. 2, are provided for the adjacent shelving row.

The forward shelving row illustrated in FIG. 13 includes two withdrawal stations or bays 91 which are in communication each with separate respective cutting machines 12 by way of respective conveyors 20. Two free bays 92 and 93 are provided opposite to the associated withdrawal station or bay 91 and these free bays are in communication over rails 94 with two corresponding free bays of the next shelving row, the pallets 2 being mobile automatically back and forth by means of trolleys 95 and 96 between the mutually associated free bays of the two shelving rows. The rails 94 are interrupted in the region of the tracks 8 and 89 on which the transport devices move. So that thus there is no detriment to the mobility of the trolleys 95 and 96, the trolleys have several axles distributed over their total length, the interval of adjacent axles being not equal to the interval of the tracks 8 and 89, so that at most the wheels of one axle only are ever without contact with the rails 94. In this way the pallets 2 can be brought simply from the rear shelving row into one of the free bays 92 or 93 and after processing back again out of the other of these free bays.

The transport device 4, 5 as illustrated in FIG. 2 can serve as transport connection between the free bays 92 and 93 and the withdrawal station or bays 91. It has however proved still more expedient to provide a special transfer device mobile on rails 97 and 98 for this task.

Figure 15:
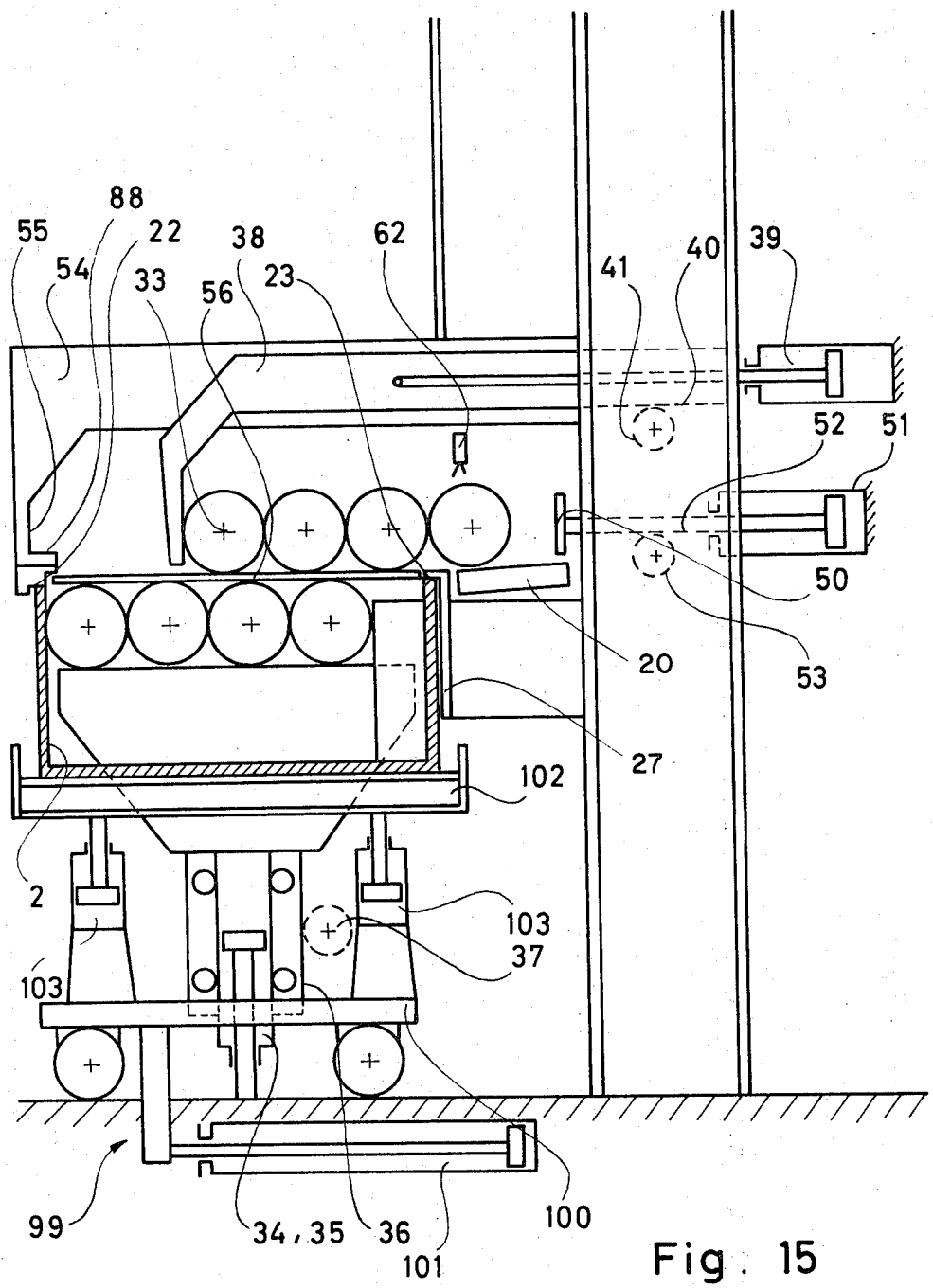
FIG. 15 is a cross-sectional view of a further embodiment of a withdrawal bay suitable for use in the present invention.
Figure 16:
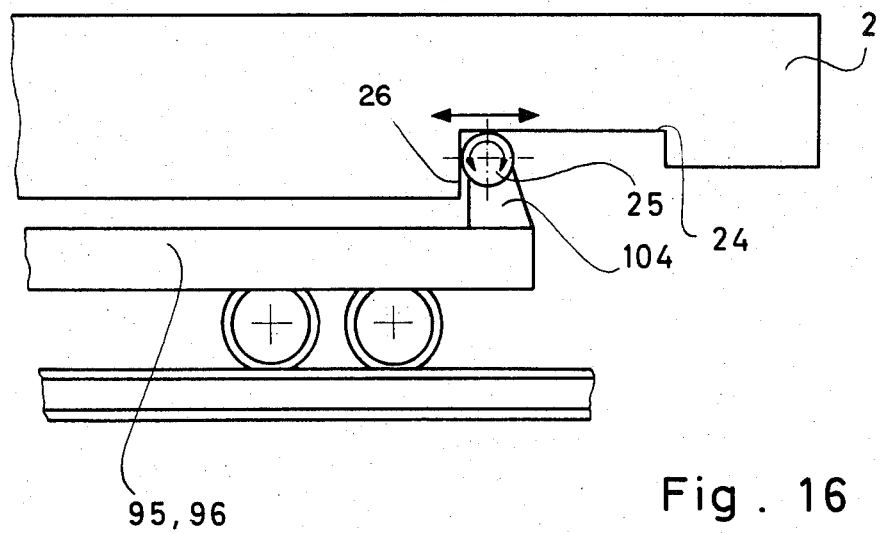
FIG. 16 is a detail view of part of a shifting device suitable for use in the present invention.
Figure 17:
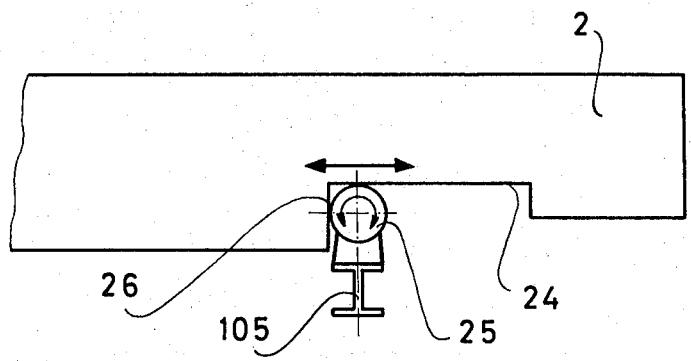
FIG. 17 is a detail view of a pallet suitable for use in the present invention.
Figure 18:
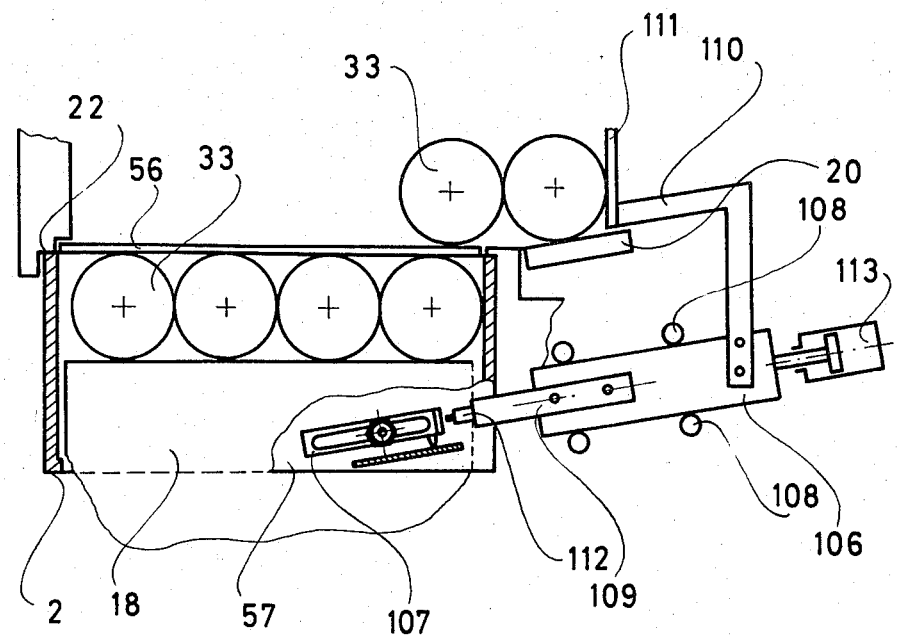
FIG. 18 is an elevational view of a material stop suitable for use in the present invention.
Figure 19:
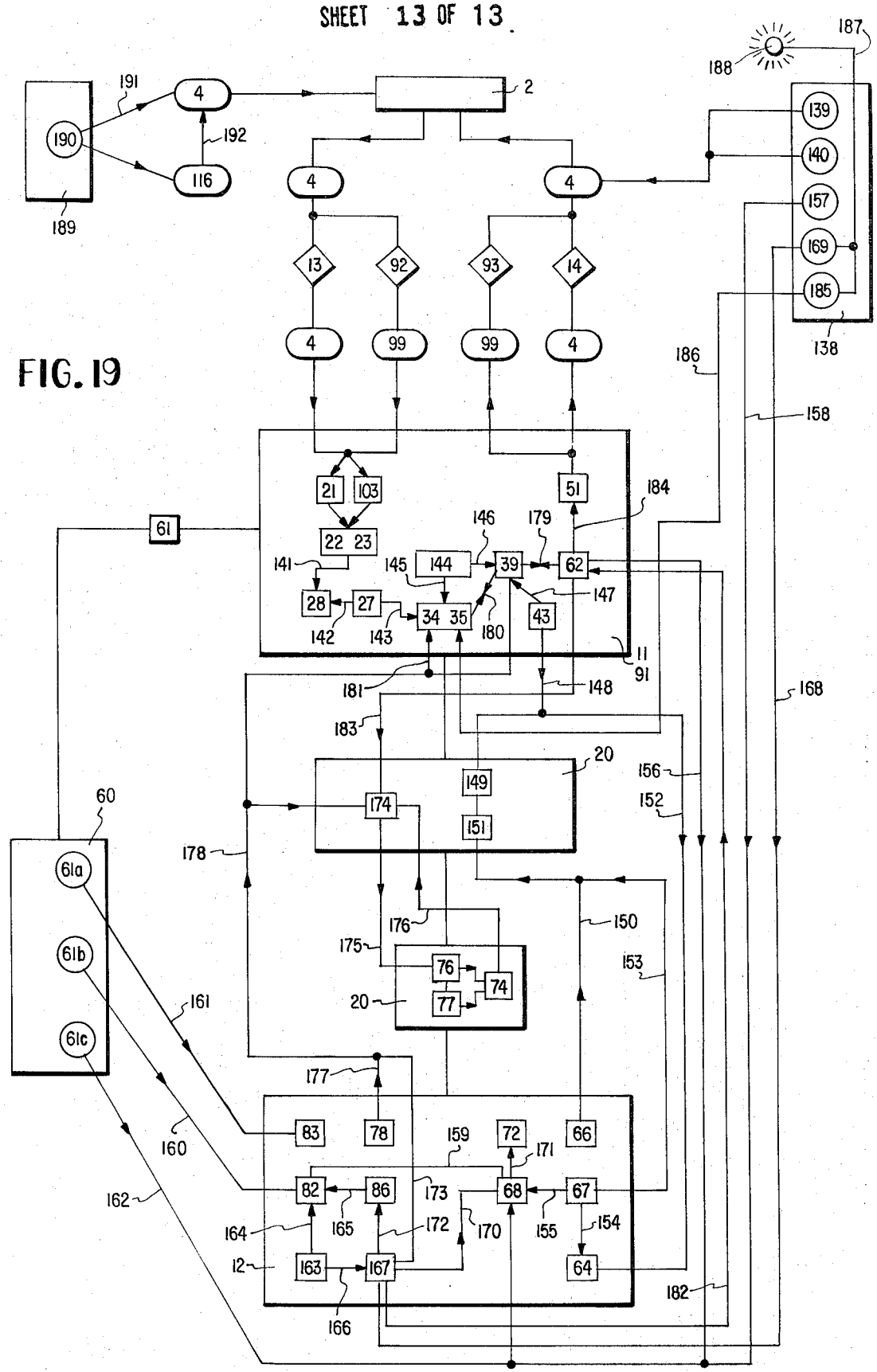
FIG. 19 is a simplified diagram showing the essential electrical arrangement of the apparatus of the apparatus components and their inter-connection.

A transfer device 99 is illustrated, in simplified form, in FIG. 15. It consists of a mobile trolley 100 which is movable back and forth by means of a cylinder-piston unit 101 acting on it between the free bays 92 and 93 and the associated withdrawal station or bay 91. On the trolley 100 two supports 102 are raisable and lowerable by means of cylinder-piston units 103, the supports 102 being so formed that they grasp from the narrow side beneath the pallets 2, that is to say so that the two cylinder-piston units 103 which move each support 102 have a distance from one another which is greater than the length of the pallets 2. This is necessary so that the cylinder-piston units 103 carrying the supports 102 can pass outside the free bay 92 in order to reach the free bay 93.

Thus the transfer device 99 effects the transfer of a pallet 2 for the next working action, for example from the free bay 92, after it has deposited the pallet with the previously worked material in the free bay 93. If the pallet 2 of the bay 92 is lifted, it can there be straightened first against the vertical abutment wall by means of the cylinder-piston unit 101. Then the pallet is transferred into the associated withdrawal station or bay 91 likewise by the action of the cylinder-piston unit 101, and driven there against the stops 22 and 23 and the abutment wall 27 by common action of the cylinder-piston units 101 and 103. From then onwards everything takes place further as already described with reference to FIGS. 1 to 12.

While the material which is contained in the particular pallet 2 situated in the withdrawal station or bay 91 is being worked, another pallet 2 deposited in the free bay 93 can either be brought into place by the transport device 4, 5 (FIG. 2) associated with the front shelving row illustrated in FIG. 13, or it is driven by means of the trolley 95 into the free bay of the rear shelving row corresponding to the free bay 93, in order thence to be brought by the transport device of the rear shelving row into its place. This takes its course in the converse manner when the pallets 2 are brought forward in sequence for the working of the material contained in them.

which closes off said pallets in the direction of the cutting machine, said second stop means is positioned forward of said transverse wall, said carriage means is movably positioned obliquely upwardly from said second stop means, said first stop means is an arm connected to said carriage means, and said carriage means is at least partially supported by said end contact means, the force acting on said carriage means being provided at least in part by gravity acting on said carriage, said arm, said end contact means and said first stop means.

27. An apparatus as defined in claim 24, wherein said first stop means, said carriage means and said connective means are displaceable away from that pallet situated in said withdrawal bay.

28. An apparatus as defined in claim 27, further comprising a cylinder-piston unit coupled to said carriage means for displacing said carriage means, said first stop means and said connective means against the force acting on said carriage means.

29. An apparatus as defined in claim 1, including a plurality of layers of the material accommodated in at least one of said pallets and a number of plates interposed between said layers of the material.

30. An apparatus as defined in claim 29, further comprising means operatively arranged for raising the material subsequent to the consumption of one of the material layers by an amount corresponding to the thickness of one of said plates before the next material layer is lifted out, and wherein said means for withdrawing material includes at least one push member, said push member being operatively arranged for ejecting said plates.

31. An apparatus as defined in claim 1, wherein each of said pallets includes a transverse wall against which the front ends of material rods to be worked which already have been cut smooth may be positioned in said pallets, while the front ends of material rods to be worked which have not been cut smooth may be spaced from said transverse wall in said pallets, further comprising light sensing means for detecting the absence of the material rods which already have been cut smooth arranged in the vicinity of said conveyor means and in the vicinity of a region between said transverse wall and the front ends of the material rods which have not been cut smooth, and wherein said program control system means is coupled to said light sensing means and is responsive to an output signal therefrom for switching in an auxiliary program to the cutting machine for firstly causing the particular material rod being worked to be cut smooth while by-passing said main program.

32. An apparatus as defined in claim 31, wherein said light sensing means comprises light responsive member arranged on or above said conveyor means, said light responsive member being responsive to interruption of a light ray.

33. An apparatus as defined in claim 31, wherein at least one of said data carriers includes a special code for effecting the bridging over of the function of said light sensing means.

34. An apparatus as defined in claim 1, wherein said data carrier includes a special code for signaling an ideal minimum weight of pallet content, and further comprising means for determining the weight of pallet content including lifters operatively arranged to carry this content, pressure operated cylinder-piston units coupled to said lifters and means responsive to the pressure prevailing in said cylinder-piston units for signaling the actual weight of pallet content, and means for comparing a signal from said means responsive to the pressure and a signal from said data carrier determined by said special code for providing an output signal to said program control system means for interrupting work on the material whenever the weight of the pallet content falls short of a value corresponding to the minimum weight of one material piece and the material available on the cutting machine is consumed, one or more parts of this material still being next programmed to be cut.

35. An apparatus as defined in claim 34, further comprising means responsive to the output signal from said means for comparing for causing said pallet transport means to being another of said pallets with a similar material into said withdrawal bay.

36. An apparatus as defined in claim 34, wherein said means for comparing is operatively arranged to signal the substantial emptying of individual pallets.

37. An apparatus as defined in claim 1, wherein each of said pallets is provided with a transverse wall which closes off respective pallets on a side facing the cutting machine, said data carriers being arranged on respective ones of said transverse walls.

38. An apparatus as defined in claim 37, wherein each of said data carriers comprises a horizontally perforated strip extending transversely of the longitudinal direction of said pallets and pins selectively secured into individual holes in said strip according to the type of material to be situated in respective pallets, and wherein said sensing means includes end contact means operatively positioned to be operated by said pins.

39. An apparatus as defined in claim 1, wherein said conveyor means is inclined transversly of its longitudinal extent so as to define a lower longitudinal edge; and further comprising movable feed means for feeding material to the cutting machine, and a vertical guide rail having a hinged portion and extending between said withdrawal bay and the cutting machine into the region of movement of said feed means, said hinged portion being movable out of this region.

40. An apparatus as defined in claim 1, further comprising two spaced apart material sensors positioned in the vicinity of said conveyor means along its longitudinal direction, ejector means positioned between said withdrawal bay and the cutting machine in the vicinity of said conveyor means for selectively ejecting some material pieces from said conveyor means, means responsive to the sequential and non-concurrent appearance of signals from said two material sensors for enabling said ejector means, and means responsive to the sequential and non-concurrent appearance of signals from said two material sensors for shutting off said conveyor means.

41. An apparatus as defined in claim 40, further comprising a guide rail having a movable portion, and wherein said two material sensors comprise two light responsive sensors and said ejector means includes a cylinder-piston unit coupled to said movable portion and positioned in the vicinity of said conveyor means for displacing said movable portion over said conveyor means transversely of its longitudinal direction.

42. An apparatus as defined in claim 40, further comprising feed means for feeding material to the cutting machine and material sensor means responsive to the disappearance of material from said feed means during a cutting operation, and means responsive to a signal from said material sensor means for interrupting the operation of the cutting machine, removing residue material from the cutting machine via said conveyor means and said ejector means and initiating supply of a further material piece.

43. An apparatus as defined in claim 42, wherein said feed means are clamping jaws displaceable in the longitudinal direction of said conveyor means and transversely thereof, and said material sensor means includes contact means and a force charged flap, said flap being carried by one of said jaws and said contact being operatively positioned to be operated by contact with said forced charged flap whenever no material is present between said jaws.

44. An apparatus as defined in claim 1, in combination with the cutting machine, said cutting machine including a cutting member, a material sensor, a contact means, a movable part on which said cutting member and said material sensor are positioned and means for controlling the feed speed of said movable part; said material sensor being operatively positioned to contact the material to be cut before said cutting member, in the feed direction, said contact being operable by said material sensor and said means for controlling the feed speed is responsive to signals from said contact means, whereby the feed speed of the movable part is variable.

45. An apparatus as defined in claim 1, in combination with the cutting machine, said cutting machine including a cutting member, a stop and material sensor means; said stop being operatively positioned in alignment with that side of said cutting member facing the material and said material sensor means being operatively positioned for checking the abutment of the material with said stop, before the initiation of the work of said cutting machine, and further comprising means responsive to a signal from said material sensor means for switching on said conveyor means anew whenever there is incorrect abutment.

46. An apparatus as defined in claim 1, wherein at least one of said shelving units comprises a charging bay in which an empty pallet may be positioned for filling with material.

47. An apparatus as defined in claim 46, wherein said shelving units are positioned to define a plurality of shelving unit rows, each row including a free bay aligned with said charging bay in the longitudinal direction of said pallets, said charging bay being drivable automatically into said free bays.

48. An apparatus as defined in claim 47, wherein said transport means includes a plurality of transport devices each operatively associated with a respective one of said rows and each having an inverted U-shaped framework, and further comprising guide rails for guiding said charging bay into said free bays which are aligned with said charging bay, said guide rails being interrupted in the region of movement of said U-shaped arms; and said charging bay includes means for assuring horizontal guidance on said guide rails despite the interruption of these rails.

49. An apparatus as defined in claim 48, wherein said means for assuring guidance comprises at least three pairs of rollers each having a respective axis of rotation, said axis being arranged in a common vertical plane.

50. A system for processing material comprising, in combination:
   a. process control means for providing process control signals from a stored program;
   b. a material processing apparatus coupled to said process control means and responsive to signals therefrom for effecting a predetermined sequence of process operations on the material;
   c. means for storing in a systematic arrangement differing materials to be processed, said means for storing including a plurality of movable material holders, each of said material holders including data carrier means for storing process data;
   d. a material withdrawal station;
   e. material holder transporting means coupled to said control means and responsive to signals therefrom for moving said material holders into and out of said withdrawal station in predetermined order;
   f. conveyor means positioned between said withdrawal station and said material processing apparatus for moving material between said withdrawal station and said material processing apparatus; and
   g. sensing means operatively associated with said withdrawal station and responsive to data from said data carrier means for provided additional process control signals, said material processing apparatus being coupled to said sensing means and responsive to the additional process control signals therefrom.

* * * * * operation, the apparatus including program control system means for receiving a main program of piece numbers and data for determining the respective lengths of the parts to be cut from the material, and means responsive to signals from the program control system means for advancing the material into the cutting machine in respective lengths to be cut off including cutting loss caused by the cutting means, the improvement comprising: a plurality of pallets of substantially equal size for storing material to be cut, each pallet being suitable for storing material of a respective substance and a respective cross section; a plurality of shelving units each containing a plurality of storage bays one above another, each of said pallets being stored in a respective one of said storage bays one above another and in alignment with one another, and at least one of said shelving units being positioned in spaced relation with respect to another of said shelving units transversely of the longitudinal extent of said pallets so as to provide a free space between these shelving units in this direction, the width of said free space being greater than that of said pallets; conveyor means drivable in two opposite directions; means including a withdrawal bay operatively associated with one of said shelving units for withdrawing material from said pallets onto said conveyor means and for reinserting material from said conveyor means onto said pallets, said withdrawal bay being positioned substantially parallel to said pallets, said conveyor means extending in the longitudinal direction of said pallets from said withdrawal bay to the cutting machine; pallet transport means for bringing said pallets from said storage bays over said shelving units and via the free space between said shelving units into said withdrawal bay and back again, said transport means and said means for withdrawing and reinserting material and said conveyor means being coupled to said program control system means and responsive to signals therefrom; a data carrier on each said pallet adapted to store data which determine the working speed of the cutting machine and the pressure exerted by said clamping means upon the material being cut with regard to the nature of the material assigned to each respective pallet; and sensing means associated with said withdrawal bay for sensing the data carried by said data carriers, said clamping jaw means and said cutting machine being responsive to signals from said sensing means which establish the pressure exerted by the clamping jaw means and the working speed of the cutting machine.

2. An apparatus as defined in claim 1, further comprising a first free bay and a second free bay in the vicinity of said withdrawal bay, and wherein said transfer means for bringing said pallets into said withdrawal bay and back again are operatively arranged firstly for bringing said pallets into said first free bay and thence into said withdrawal bay and secondly for bringing said pallets into said second free bay and thence into respective storage bays.

3. An apparatus as defined in claim 1, wherein each of said shelving units comprises at least two vertical supports, a plurality of arms secured to said supports and extending transversely of the longitudinal extent of said pallets, as support for said pallets, said arms and said supports being arranged with spacing inwardly from the longitudinal ends of said pallets and forming said storage bays.

4. An apparatus as defined in claim 1, wherein said transport means comprises: tracks extending horizontally beside said shelving units, one of said tracks lying nearest said cutting machine extending with spacing above said conveyor means; and a transport device having an inverted U-shaped framework extending over said shelving units and having the free ends of its downwardly extending legs movably positioned on said tracks; a vertically displaceable arm extending from each said downwardly extending leg of said U-shaped framework, said arms being synchronized in their vertical displacement and movable out of said free space between said shelving units to beneath said pallets; and drive means positioned on said transport device for moving said transport device.

5. An apparatus as defined in claim 1, wherein said shelving units define a single shelving unit row, and include a first free bay and a second free bay in the vicinity of said withdrawal bay.

6. An apparatus as defined in claim 1, wherein said shelving units include a first shelving unit and a second shelving unit spaced from one another and defining a shelving unit row, said withdrawal bay being associated with said first shelving unit and said second shelving unit having a first free bay and a second free bay arranged substantially opposite said withdrawal bay; and further comprising mobile transfer means positioned between said withdrawal bay and said second shelving unit for transferring said pallets in the longitudinal direction of said shelving unit row.

7. An apparatus as defined in claim 6, wherein said transfer means includes at least two automatically vertically synchronously displaceable arms extending horizontally and in the longitudinal direction of said pallets, said arms extending into the vicinity of said pallets so as to be drivable under said pallets out of the free space between said shelving units.

8. An apparatus as defined in claim 6, further comprising at least one additional plurality of shelving units, each said additional plurality of shelving units defining a further shelving unit row, said further shelving unit row including an additional first free bay and an additional second free bay aligned in the longitudinal direction of said pallets and with said first free bay and said second free bay respectively; and means interconnecting said first free bay with said additional first free bay and said second free bay with said additional second free bay for shifting said pallets.

9. An apparatus as defined in claim 8, wherein said means for shifting said pallets comprise rail means connecting said first first free bay with said additional first free bay and said second free bay with said additional second free bay, and multi-axle trolley means mobile on said rail means; and said transport means comprises tracks horizontally beside said shelving units, and respective transport devices each having an inverted U-shaped framework extending over respective pluralities of shelving units and having the free ends of their downwardly extending legs movably positioned on said tracks, said rail means being interrupted in the regions of movement of said U-shaped frameworks and said multi-axles being distributed over the length of said trolley means for assuring that said trolley means are always guided horizontally despite interruption of said rail means.

10. An apparatus as defined in claim 1, wherein said means for withdrawing material from said pallets comprises stop means and at least two synchronously vertically and horizontally displaceable supports for moving said pallets upwards and in the direction of said conveyor means against said stop means which limit the vertical and horizontal movements.

11. An apparatus as defined in claim 10, further comprising rollers each having a horizontally adjustable axis, said rollers being carried by said supports in a plane parallel to the longitudinal extent of said pallets, and wherein each of said pallets has recesses in its underside engageable with said supports via said rollers for adjustment in the longitudinal direction.

12. An apparatus as defined in claim 10, further comprising rollers, a free bay, a pallet shifting device operatively associated with said free bay and having auxiliary supports which carry said rollers, and wherein each of said pallets has recesses in its underside engageable with said auxiliary supports via said rollers.

13. An apparatus as defined in claim 10, further comprising means including end contacts operatively positioned to be activated whenever any of said pallets contact said stop means for halting the vertical and horizontal movements of said supports.

14. An apparatus as defined in claim 10, further comprising cylinder-piston units operatively associated with said supports for effecting the vertical and horizontal movement of these supports.

15. An apparatus as defined in claim 14, further comprising a plurality of racks, a plurality of pinions and first and second common shafts, and wherein each of said cylinder-piston units includes a movable part which carries a respective one of said racks, each respective one of said racks extending in the direction of movement and meshing with one of said pinions, those of said pinions associated with those of said cylinder-piston units which effect vertical movement being arranged on said first common shafts, and those of said pinions associated with those of said cylinder-piston units which effect horizontal movement being arranged on said second common shaft.

16. An apparatus as defined in claim 14, wherein said cylinder-piston units comprise first cylinder-piston units for providing vertical movement of said supports and second cylinder-piston units for providing horizontal movement of said supports, said second cylinder-piston units being vertically displaceable with the vertical movement.

17. An apparatus as defined in claim 14, further comprising pallet transfer means, said supports being carried by said pallet transfer means and said second cylinder-piston units being coupled to said pallet transfer means for providing horizontal movement of this means.

18. An apparatus as defined in claim 17, further comprising a first free bay and a second free bay, and said second cylinder-piston units being effective for displacing said pallet transfer means between said withdrawal bay and said first and second free bays.

19. An apparatus as defined in claim 18, wherein said first free bay includes stop means, said cylinder-piston units being effective for positioning said pallets against said stop means.

20. An apparatus as defined in claim 1, wherein said means for withdrawing and for reinserting material includes at least two vertically and synchronously displaceable lifters having a given cross section and a width which corresponds to the width of said pallets, measured perpendicularly of their longitudinal extent; wherein said pallets have bottom openings corresponding to said cross section of said lifters; and wherein said means for withdrawing and for reinserting material further includes at least two horizontally and synchronously moveable first push members for pushing the material, after lifting out of a pallet, onto said conveyor means; at least two additional horizontally and synchronously moveable push members for pushing material after working into a pallet from said conveyor means; a first plate interconnecting said first push members in the vicinity of their portions coming in contact with the material, and a second plate interconnecting said additional push members in the vicinity of their portions coming in contact with the material.

21. An apparatus as defined in claim 20, further comprising first, second and third cylinder-piston units each having a moving part; first, second and third racks carried by respective ones of said moving parts; first, second and third pinions meshed with respective ones of said racks; and first, second and third common shafts on which said first, second and third pinions are respectively seated; respective ones of said moving parts being coupled respectively to said lifters, said first push members and said additional push members.

22. An apparatus as defined in claim 20, further comprising a cylinder-piston unit and carrier means on which said lifters are mounted and which extends in the longitudinal direction of said pallets, said cylinder-piston unit being operatively arranged to act upon said carrier means.

23. An apparatus as defined in claim 20, further comprising first stop means arranged above said conveyor means, end contact means positioned so as to be operated by said first stop means for interrupting movement of said first push members to assure that only one piece of the material may be pushed onto said conveyor means at one time, means for adustably setting said first stop means including second stop means adjustably arranged on each of said pallets and means for coupling said first stop means to said second stop means, and further comprising means for interrupting the elimination of the withdrawal motions of said first push members only when a piece of material is consumed and further parts have to be cut from the material being worked.

24. An apparatus as defined in claim 23, wherein said means for coupling said first stop means and said second stop means comprises adjustably positionable carriage means on which said first stop means and said end contact means are positioned, and connective means positioned between said carriage means and said second stop means whereby the position of the carriage means is effected by the second stop means acting against a force acting on the carriage means.

25. An apparatus as defined in claim 24, wherein said second stop means is arranged on the underside of each pallet, said carriage means is horizontally movable, said first stop means and said end contact means are seated on said carriage means and said connective means comprises an arm against which said second stop means may come, and further comprising a cylinder-piston unit or spring means coupled to said carriage means for generating a force tending to bias said carriage means toward a given position.

26. An apparatus as defined in claim 24, wherein each of said pallets is provided with a transverse wall

UNITED STATES PATENT OFFICE
CERTIFICATE OF CORRECTION

Patent No. 3,810,404         Dated May 14th, 1974

Inventor(s) Paul Stolzer

It is certified that error appears in the above-identified patent and that said Letters Patent are hereby corrected as shown below:

In the heading of the patent, line 3, change "Keura" to --KEURO--, line 4, change "vit" to --mit--; Column 1, line 53, change "approximately" to --appropriately-- and change "operations" to --operators--; Column 2, line 36, change "machine" to --member--; Column 3, line 49, change "adjusted" to --adjustable--, line 56, change "adjusted" to --adjustable--; Column 8, line 38, change "rods" to --rod--; Column 11, line 26, after "view of the" insert --wide--; Column 14, line 52, after "pallets" insert --2--; Column 19, line 37, change "taks" to --task--; Column 24, line 6, change "transport-device" to --transport device--, line 19, change "mode" to --code--.

Signed and sealed this 5th day of November 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,810,404          Dated May 14th, 1974

Inventor(s) Paul Stolzer

It is certified that error appears in the above-identified patent and that said Letters Patent are hereby corrected as shown below:

In the heading of the patent, line 3, change "Keura" to --KEURO--, line 4, change "vit" to --mit--; Column 1, line 53, change "approximately" to --appropriately-- and change "operations" to --operators--; Column 2, line 36, change "machine" to --member--; Column 3, line 49, change "adjusted" to --adjustable--, line 56, change "adjusted" to --adjustable--; Column 8, line 38, change "rods" to --rod--; Column 11, line 26, after "view of the" insert --wide--; Column 14, line 52, after "pallets" insert --2--; Column 19, line 37, change "taks" to --task--; Column 24, line 6, change "transport-device" to --transport device--, line 19, change "mode" to --code--.

Signed and sealed this 5th day of November 1974.

(SEAL)
Attest:

McCOY M. GIBSON JR.
Attesting Officer

C. MARSHALL DANN
Commissioner of Patents